(12) United States Patent
Funakoshi et al.

(10) Patent No.: US 8,117,023 B2
(45) Date of Patent: Feb. 14, 2012

(54) LANGUAGE UNDERSTANDING APPARATUS, LANGUAGE UNDERSTANDING METHOD, AND COMPUTER PROGRAM

(75) Inventors: Kotaro Funakoshi, Tokyo (JP); Mikio Nakano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 1074 days.

(21) Appl. No.: 11/999,236

(22) Filed: Dec. 4, 2007

(65) Prior Publication Data
US 2008/0140389 A1 Jun. 12, 2008

(30) Foreign Application Priority Data

Dec. 6, 2006 (JP) .................... 2006-329493

(51) Int. Cl.
*G06F 17/27* (2006.01)
(52) U.S. Cl. ............................................. 704/9
(58) Field of Classification Search ............. 704/9
See application file for complete search history.

(56) References Cited

U.S. PATENT DOCUMENTS

| | | | | | |
|---|---|---|---|---|---|
| 5,386,556 | A | * | 1/1995 | Hedin et al. ...................... | 1/1 |
| 5,555,169 | A | * | 9/1996 | Namba et al. ................... | 704/9 |
| 6,920,420 | B2 | * | 7/2005 | Lin ................................. | 704/9 |
| 6,950,793 | B2 | * | 9/2005 | Ross et al. ...................... | 704/9 |
| 7,027,974 | B1 | * | 4/2006 | Busch et al. .................... | 704/4 |
| 7,216,073 | B2 | * | 5/2007 | Lavi et al. ....................... | 704/9 |
| 7,333,928 | B2 | * | 2/2008 | Wang et al. ..................... | 704/9 |
| 7,493,253 | B1 | * | 2/2009 | Ceusters et al. ................. | 704/9 |
| 2004/0111255 | A1 | * | 6/2004 | Huerta et al. .................. | 704/10 |
| 2007/0073680 | A1 | * | 3/2007 | Kawamura et al. ............. | 707/5 |

FOREIGN PATENT DOCUMENTS

| | | |
|---|---|---|
| JP | 5-143640 | 6/1993 |
| JP | 11-232274 | 8/1999 |
| JP | 2005-115922 | 4/2005 |
| JP | 2005-301780 | 10/2005 |

OTHER PUBLICATIONS

Yamamoto, Mikio et al., "A Robust Spoken Dialogue System Based on Understanding Mechanism of Human Being," *Transactions of Information Processing Society of Japan*, vol. 36(4):471-482 (1995).
Japanese Office Action for Application No. 2006-329493, dated May 26, 2009.

* cited by examiner

*Primary Examiner* — Samuel G Neway
(74) *Attorney, Agent, or Firm* — Nelson Mullins Riley & Scarborough LLP; Anthony A. Laurentano

(57) ABSTRACT

This language understanding apparatus includes a storage section, a phrase interpreter, and a bidding section. The bidding section reads information on a slot of a semantic frame corresponding to a concept indicated by an information read by the phrase interpreter and information on a concept corresponding to the slot by referring to the storage section, specifies, for each semantic frame read, from the concept representation detected by the phrase interpreter, a concept representation corresponding to a concept corresponding to each slot of the semantic frame or a subordinate concept of that concept, and a concept representation whose slot of another semantic frame is not bidden, and repeats bidding the slot for the specified concept representation, thereby generating slot allocation table data indicating a bidding result.

16 Claims, 14 Drawing Sheets

| reserve | FRAME 1 | reserveF0 ( *start, stay, type, quant, smoke* ) |
|---|---|---|
| | FRAME 2 | reserveF1 ( *start, end, type, quant, smoke* ) |

FIG. 5

SLOT DEFINITION

| SLOT NAME | TARGET CONCEPT | SLOT DEFINITION | MARKER | CLARIFICATION DEMAND REPRESENTATION |
|---|---|---|---|---|
| start | date | "CHECK IN" | "FROM" | "FROM WHEN DO YOU STAY?" |
| end | date | "CHECK OUT" | "TO UNTIL" | "HOW LONG DO YOU STAY?" |
| stay | stay | "NUMBER OF STAYING NIGHTS NUMBER OF DAYS" | — | "HOW MANY NIGHTS DO YOU STAY?" |
| type | type | "TYPE OF ROOM ROOM TYPE" | — | "WHAT KIND OF ROOM DO YOU WANT?" |
| quant | quantity | "NUMBER OF ROOMS" | — | "HOW MANY ROOMS DO YOU USE?" |
| smoke | smoke | "NON-SMOKING TOBACCO" | — | "SMOKING OR NON-SMOKING?" |

RESERVE (9) SINGLE (6) AND DOUBLE (7) ONE ROOM EACH (8) WITH CHECK-IN (3) ON AUGUST (1) 23 (2) AND CHECK-OUT (5) ON 25 (4)

(1) CONCEPT : month  (2) CONCEPT : day  (3) SLOT DEFINITION : *start*
(4) CONCEPT : day  (5) SLOT DEFINITION : *end*  (6) CONCEPT : type
(7) CONCEPT : type  (8) CONCEPT : quantity  (9) CONCEPT : reserve

FIG. 12

ACCESS TABLE FOR PARSING RESULTS

|  | AUGUST | 23 | CHECK-IN | 25 | CHECK-OUT | SINGLE | DOUBLE | ONE ROOM | RESERVE |
|---|---|---|---|---|---|---|---|---|---|
| AUGUST |  |  |  |  |  |  |  |  |  |
| 23 | 1 |  |  |  |  |  |  |  |  |
| CHECK-IN | 2 | 1 |  |  |  |  |  |  |  |
| 25 | 3 | 2 | 1 |  |  |  |  |  |  |
| CHECK-OUT |  |  |  |  |  |  |  |  |  |
| SINGLE |  |  |  |  |  |  |  |  |  |
| DOUBLE |  |  |  |  |  |  |  | 1 |  |
| ONE ROOM |  |  |  |  |  |  |  |  |  |
| RESERVE | 4 | 3 | 2 | 1 | 1 | 2 |  | 1 | 1 |

FIG. 13

SLOT ALLOCATION TABLE (AFTER BIDDING)

|  | AUGUST | 23 | 25 | SINGLE | DOUBLE | ONE ROOM | RESERVE |
|---|---|---|---|---|---|---|---|
| AUGUST |  |  |  |  |  |  |  |
| 23 | month |  |  |  |  |  |  |
| 25 |  |  |  |  |  |  |  |
| SINGLE |  |  |  |  |  |  |  |
| DOUBLE |  |  |  |  |  |  |  |
| ONE ROOM |  |  |  |  |  |  |  |
| RESERVE |  | start, end | start, end | type | type | quant |  |

SLOT ALLOCATION TABLE (AFTER SLOT COLLISION SOLUTION AND INTRASENTENTIAL OMISSION SOLUTION)

|  | AUGUST | 23 | 25 | SINGLE | DOUBLE | ONE ROOM | RESERVE |
|---|---|---|---|---|---|---|---|
| AUGUST |  |  |  |  |  |  |  |
| 23 | *month* |  |  |  |  |  |  |
| 25 | *month* |  |  |  |  |  |  |
| SINGLE |  |  |  |  |  |  |  |
| DOUBLE |  |  |  |  |  |  |  |
| ONE ROOM |  |  |  |  |  |  |  |
| RESERVE |  | *start* | *end* | *type* | *type* | *quant* |  |

FIG. 18

U 1 : RESERVE ONE SINGLE ROOM
S 2 : FROM WHEY YOU STAY?
U 3 : CHECK IN TOMORROW CHECK OUT DAY AFTER TOMORROW

FIG. 19

U 1 : RESERVE SINGLE AND DOUBLE ONE ROOM EACH
      FOR THREE NIGHTS FROM TOMORROW
S 2 : SMOKING OR NON-SMOKING?
U 3 : SINGLE SMOKING AND DOUBLE NON-SMOKING

FIG. 20

ASSIGNMENT 1

| ◁ 2006年8月 ▷ |
| MO TU WE TH FR SA SU |
| 1 2 3 4 5 6 |
| 7 8 9 [10 11] 12 13 |
| 14 15 16 17 18 19 20 |
| 21 22 23 24 25 26 27 |
| 28 29 30 31 |

- STAY PERIOD:
  FRAMED PERIOD ON THE LEFT CALENDAR

ASSIGNMENT 2

| ◁ 2006年8月 ▷ |
| MO TU WE TH FR SA SU |
| 1 2 3 4 5 6 |
| 7 8 9 10 11 12 13 |
| 14 15 16 17 18 19 20 |
| [21 22 23 24 25 26 27] |
| 28 29 30 31 |

- STAY PERIOD:
  FRAMED PERIOD ON THE LEFT CALENDAR
- MEMBERS:
  YOU, FRIEND 1 (MALE), FRIEND 2 (MALE),
  FRIEND 3 (FEMALE), FRIEND 4 (FEMALE)

ASSIGNMENT 3

| ◁ 2006年8月 ▷ |
| MO TU WE TH FR SA SU |
| 1 2 3 4 5 6 |
| 7 8 9 10 11 12 13 |
| 14 [15 16 17 18] 19 20 |
| 21 22 23 24 25 26 27 |
| 28 29 30 31 |

- STAY PERIOD:
  FRAMED PERIOD ON THE LEFT CALENDAR
- FAMILY:
  YOU, YOUR SPOUSE, YOUR FATHER, YOUR MOTHER,
  FIRSTBORN DAUGHTER (TWELFTH GRADE), FIRSTBORN SON
  (EIGHTH GRADE), SECOND SON (FIFTH GRADE)
- OTHERS:
  YOUR FATHER IS A HEAVY SMOKER
  YOUR MOTHER HATES A BED

ASSIGNMENT 4

| ◁ 2006年8月 ▷ |
| MO TU WE TH FR SA SU |
| 1 2 3 4 5 6 |
| 7 8 9 10 11 12 13 |
| 14 15 16 17 18 19 20 |
| 21 22 23 24 25 [26 27] |
| [28 29] 30 31 |

- STAY PERIOD:
  FRAMED PERIOD ON THE LEFT CALENDAR
- PERSONS ON BUSINESS TRIP:
  YOU, SUPERIOR (MALE), COWORKER (FEMALE)
- OTHERS:
  SUPERIOR IS A HEAVY SMOKER
  TRY TO REDUCE ROOM EXPENSE AS MUCH AS POSSIBLE
  FOR EXPENSE REDUCTION

ASSIGNMENT 5

| ◁ 2006年8月 ▷ |
| MO TU WE TH FR SA SU |
| 1 2 3 4 5 6 |
| [7 8 9] 10 11 12 13 |
| 14 15 16 17 18 19 20 |
| [21 22 23] 24 25 26 27 |
| 28 29 30 31 |

- STAY PERIOD:
  FRAMED PERIOD ON THE LEFT CALENDAR
- PERSONS ON BUSINESS TRIP:
  YOU, SUPERIOR (SAME SEX AS YOURS)
- OTHERS:
  YOU DO NOT SMOKE TOBACCO
  SUPERIOR IS A HEAVY SMOKER

FIG. 21

U : I WANT TO RESERVE FOR SEVEN FOR FOUR NIGHTS FROM AUGUST 15

S : WHAT KIND OF ROOM DO YOU WANT? THERE ARE SINGLE, DOUBLE, TWIN, TRIPLE AND JAPANESE ROOM (FOUR-PERSON ROOM)

U : ONE SMOKING SINGLE ROOM, NON-SMOKING JAPANESE ROOM, ONE TWIN ROOM

S : PLEASE CONFIRM FOLLOWING RESERVATION DETAILS
    ITEM 1: CHECK IN: AUGUST 15, 2006,
            CHECK OUT: AUGUST 19, 2006 (FOUR NIGHTS)
            ROOM TYPE: SINGLE ROOM: 1 SMOKING
    ITEM 2: CHECK IN: AUGUST 15, 2006,
            CHECK OUT: AUGUST 19, 2006 (FOUR NIGHTS)
            ROOM TYPE: JAPANESE ROOM: 1 NON-SMOKING
    ITEM 3: CHECK IN: AUGUST 15, 2006,
            CHECK OUT: AUGUST 19, 2006 (FOUR NIGHTS)
            ROOM TYPE: TWIN ROOM: 1 NON-SMOKING

FIG. 22

U : I WANT TO RESERVE FOR TWO NIGHTS FROM AUGUST 7 AND FOR TWO NIGHTS FROM AUGUST 21

S : WHAT KIND OF ROOM DO YOU WANT? THERE ARE SINGLE, DOUBLE, TWIN, TRIPLE AND JAPANESE ROOM (FOUR-PERSON ROOM)

U : TWIN FOR BOTH STAYS PLEASE

S : HOW MANY ROOMS DO YOU WANT?

U : ONE ROOM

S : NON-SMOKING OR SMOKING?

U : SMOKING PLEASE

S : PLEASE CONFIRM FOLLOWING RESERVATION DETAILS
    ITEM 1: CHECK IN: AUGUST 7, 2006,
            CHECK OUT: AUGUST 9, 2006 (TWO NIGHTS)
            ROOM TYPE: TWIN ROOM: 1 SMOKING
    ITEM 2: CHECK IN: AUGUST 21, 2006,
            CHECK OUT: AUGUST 23, 2006 (TWO NIGHTS)
            ROOM TYPE: TWIN ROOM: 1 SMOKING

U : YES

S : ALL RIGHT. FEE IS 40,000 YEN.

FIG. 23

| | ASSIGNMENT 1 | ASSIGNMENT 2 | ASSIGNMENT 3 | ASSIGNMENT 4 | ASSIGNMENT 5 | TOTAL |
|---|---|---|---|---|---|---|
| NUMBER OF SUCCESSFUL DIALOGUES | 8/9 | 6/8 | 4/9 | 4/8 | 4/6 | 26/40 |
| SUCCESS RATE (%) | 88.9 | 75.0 | 44.4 | 50.0 | 66.6 | 63.4 |

FIG. 24

| | | FRAME-SLOTH VALUE RELATIONSHIP | | |
|---|---|---|---|---|
| | | YES | NO | TOTAL |
| ACCEPTABILITY OF DEPENDENCY DESTINATION | OK | 211 | 218 | 429 |
| | NG | 16 | 8 | 24 |
| | TOTAL | 227 | 226 | 453 |

FIG. 25

| (DEPENDENCY DESTINATION, FRAME-SLOTH VALUE RELATIONSHIP) | OK | NG | TOTAL |
|---|---|---|---|
| (OK, YES) | 205 (97.2%) | 6 (2.8%) | 211 |
| (OK, NO) | 201 (92.2%) | 17 (7.8%) | 218 |
| (NG, YES) | 16 (100%) | 0 (0%) | 16 |
| (NG, NO) | 4 (50.0%) | 4 (50.0%) | 8 |

LANGUAGE UNDERSTANDING APPARATUS, LANGUAGE UNDERSTANDING METHOD, AND COMPUTER PROGRAM

BACKGROUND OF INVENTION

Priority is claimed on Japanese Patent Application No. 2006-329493, filed Dec. 6, 2006, the contents of which are incorporated herein by reference.

1. Field Of The Invention

The present invention relates to a language understanding apparatus, a language understanding method, and a computer program.

2. Description Of The Related Art

Recently, there are attempts to construct systems that understand a natural language. Such a system if designed to operate very limited operations, can be constructed relatively easily by using a voice extensible markup language (VoiceXML) or the like whereas such a system if designed to be able to understand a little complicated dialogues and languages shall face various problems.

Conventionally, syntax analysis or parsing is used in understanding a natural language. However, existing software which executes parsing still suffers lower precision for use in a dialogue system, and is difficult to satisfactorily operate for a domain to be locally handled without troublesome adjustment. In addition, it takes time to construct a semantic representation generator which generates a semantic representation from the result of parsing, and has a low reusability. Without using parsing, however, dialogues cannot go beyond the level which is carried out with an enumeration of keywords.

Understanding of a natural language and two understanding systems will be described below.

FIG. 1 is a very simplified exemplary diagram of understanding a natural language. Natural language understand in the present natural language processing paradigm is generally the function of converting a natural language representation to a task representation which can be understood by a computer. That is, natural language understanding is equivalent to processing a natural language representation including a variety of ambiguities to express it with a user's ambiguity-free semantic representation (process α in FIG. 1) and generating a task representation sufficient to execute a process which achieves the user's demand from a semantic representation (process β in FIG. 1). In the present specification, the process α is called "semantic representation generation" and the process β is called "task representation generation".

A dialogue system does not actually perform conversion of a language representation to a task representation at once, but gradually builds up semantic representations while generating/executing an auxiliary task representation to acquire supplemental information, e.g., an utterance for demanding confirmation or clarification, and generates a main task representation when sufficient information and conviction are obtained. A semantic representation is said to be an internal representation for processing a language while a task representation is said to be an internal representation for a task process.

For example, a task representation is a target state (goal) to be an input of a task planner in a robot dialogue, whereas a task representation is a SQL sentence in a database search dialogue.

Systems for natural language understanding can be generally classified into two systems depending on a difference in a system of generating a semantic representation. One is a template system called herein, which executes semantic extraction through surface matching of a keyword or a parameterized representation pattern with an input utterance. The other one is a parsing system called herein that performs parsing on an input utterance using a classifier or the like which has learned from grammatical rules and statistic data, and acquires a semantic representation from the acquired semantic tree through recursive procedures.

The template system is often used in a spoken dialogue system for it is easy to construct and maintain and realize a robuster system than the parsing system. However, the template system can handle only simple representations which can be replaced with an enumeration of keywords. The parsing system directly handles syntax recursiveness and semantic synthesis, and can therefore handle complex and multifarious language representations while it is not easy to construct and maintain and generally has lower robustness. Further, as the parsing system is premised on synthesis, it is weak on understanding a non-synthetic representation.

There is a technology of first attempting to perform parsing of the constrain-relaxation approach and generate a semantic representation through a bottom-up recursive process based on the parsing result, and, if the attempt fails, generating a semantic representation by a pattern-matching based semantic driven approach using the knowledge of a pre-given keyword pattern (see, for example. "A Robust Spoken Dialogue System Based on Understanding Mechanism of Human Being", by Mikio Yamamoto, Toshihiko Itoh, Masaru Hidano and Seiichi Nakagawa, Transactions of Information Processing Society of Japan, Vol. 36, No. 4, pp. 471-482, April 1995: Non-patent Document 1). The constrain-relaxation approach is to perform analysis according to a grammar which parses only grammatical sentences (grammatically correct sentences), and, if the analysis fails, perform a process of relaxing the constrain to correct an error.

The parsing system and the template system which are used in the conventional natural language understanding have the following problems.

First, the problems of the parsing system will be described.

FIG. 2 is an exemplary diagram of a general parsing system. FIG. 2 is equivalent to the process α in FIG. 1. As shown in FIG. 2, with the parsing system in use, a developer should prepare at least two modules: (1) a parser to generate a semantic tree from a natural language representation and (2) a semantic representation generator to generate an internal representation or semantic representation representing the semantics of the original natural language. While a semantic frame is used as a semantic representation in FIG. 2, other semantic representation styles, such as a predicate logic and semantic network, can be used as well.

For a parser, the first module, used in the parsing system, there are two options, namely, using an existing natural language parser and creating a parser itself.

Because creating a parser from the scratch results in a large cost, this option is not so practical unless a special function the general parser does not have is needed. The use of a disclosed parser has a problem too.

Execution of parsing requires not only a parsing program but also, naturally, a grammar according to a target language and domain. Some parsers come with extensive grammars, so that direct use of the parsers can provide certain parsing results. However, those accessory grammars are created based on writing corpuses, such as news articles, and have a poor parsing accuracy in a dialogue system which handles spoken languages, particularly, in a spoken dialogue system. To reduce the load of creating a semantic representation generator, there often comes a demand of handling a phrase consisting of a domain-specific proper noun, a plurality of functional words and/or a content word, as a single word. While addition of a proper noun is relatively simple, handing a phrase is not easy.

It is possible to make a grammar, but it is not an easy work to describe grammatical rules while eliminating an interference between rules and an unintended behavior. Recently, therefore, the main stream is automatic acquisition of a grammar and machine learning of the dependency likelihood instead of manual grammatical descriptions. Because those approaches need accurate and narrow annotation supported by huge corpuses and a linguistic knowledge, however, they are not practical options in consideration of the construction of a domain-limited dialogue system.

The a semantic representation generator, the second module, used in the parsing system should be constructed according to a domain and a semantic representation style used. In general, a semantic representation generator is constructed as a collection of recursive procedures, and outputs a semantic representation as a result of a recursive process with a semantic tree output from a parser being an input.

The most significant reason for the difficulty of constructing a semantic representation generator is the inconsistency between the structure of a domain concept and a syntax structure. This problem is likely to occur when an existing general-purpose parser is used. For example, it is assumed that in a weather forecast domain a concept "weather" representing weather is defined by a place and a date. Then, a language representation "weather in Tokyo tomorrow" may be represented by a semantic representation "weather(Tokyo, tomorrow)". Let "Tokyo" and "tomorrow" be symbols specifically indicating a place "Tokyo" and a date "tomorrow", respective.

In a semantic representation, "Tokyo" and "tomorrow" are governed by the concept "weather". However, the language structure should not necessarily be of the same type as the structure. In case of "weather in Tokyo tomorrow", the result of dependency analysis shows that there are two cases: one where "Tokyo" is applied to "tomorrow" and the other where "Tokyo" is applied to "weather", and it is difficult to previously know which one is output.

One solution to this difficulty is an approach of manually making a grammatical correction or making learning-based adjustment of a parser. As mentioned previously, however, it is difficult to manually adjust grammatical rules. In addition, allowing a parser to learn demands a vast amount of data. Creation of data demands an additional work, such as annotation, as well as collection of data, and is thus very troublesome and time consuming. Another solution is to allow a semantic representation generator to generate a semantic representation "weather(Tokyo, tomorrow)" from either structure. Generally, taking this approach needs difficult and tiresome programming to construct a semantic representation generator. Further, the constructed semantic representation generator contains a lot of exceptional processes, making the reusability in other domains lower.

"weather in Tokyo tomorrow" may also be represented as "weather in Tokyo tomorrow". If extra phrases are inserted, like "weather in Tokyo area tomorrow" or "weather in the vicinity of Tokyo tomorrow", semantic representation generation should not be interfered with the extra phrases. In a representation "weather in Tokyo and Osaka tomorrow", even if "tomorrow" is applied to "Tokyo", a semantic representation {weather(Tokyo, tomorrow), weather(Osaka, tomorrow)} or weather({Tokyo, Osaka}, tomorrow), weather(Osaka, tomorrow)} should be generated based on the interpretation that "tomorrow" is likewise applied to "Osaka".

The foregoing problems should be handled even when a correct parsing result is obtained, but creating a robuster generator against frequently occurring parse errors demands further efforts.

According to the technology of the Non-patent Document 1, it seems that the parsing system can better execute a highly-accurate semantic interpretation of a complex representation in a range where the applied grammar covers. However, the technology of the Non-patent Document 1 cannot overcome the aforementioned problems. For example, the approach of the technology of the Non-patent Document 1 requires that a system developer should describe a parsing grammar and rules for generating semantic representations in addition to keyword patterns. Keyword patterns are used as the last resort and a parallel structure and a recursive structure cannot be idled. That is, while the technology of the Non-patent Document 1 tries to increase the robustness while keeping the parsing accuracy by the two-stage use of the parsing system and the template system, it faces the problem that keeping understandable complexity and the robustness cannot be satisfied at the same time. In other words, while robust understanding of simple representations is possible, robust understanding of certain complex representations is not possible except for omission of a particle or inversion.

The present invention has been made in consideration of the foregoing situations, and it is an object of the invention to provide a language understanding apparatus, a language understanding method and a computer program which are capable of demonstrating robust understanding of complicated natural language representations and can relieve the work of a system developer.

SUMMARY OF THE INVENTION

To achieve the object, the present invention employs the followings.

(1) A language understanding apparatus of the present invention includes a storage section that stores concept structure data indicating a correlation between a tree structure of a concept to be used in a domain and a concept representation specifying the concept, frame definition data corresponding to a concept and indicating a correlation between one or more semantic frames for representing the concept by another concept, and one or more slots to be used in the one or more semantic frames, and slot definition data indicating a concept to be used as a slot; a phrase interpreter that receives input utterance data, detects a concept representation included in an utterance content indicated by the input utterance data by referring to the storage section, and reads information of a concept corresponding to the detected concept representation from the storage section; and a bidding section that reads information on a slot of a semantic frame corresponding to the concept indicated by the information read by the phrase interpreter and information on a concept corresponding to the slot by referring to the storage section, specifics, for each semantic frame read, from the concept representation detected by the phrase interpreter, a concept representation corresponding to a concept corresponding to each slot of the semantic frame or a subordinate concept of that concept, and a concept representation whose slot of another semantic frame is not bidden, and repeats bidding the slot for the specified concept representation, thereby generating slot allocation table data indicating a bidding result.

With such a stricture, a concept representation included in an utterance content and its concept are extracted from concept structure data which defines a concept structure in a specific domain and concept representations or specific representations of individual concepts, and the relationship between the extracted concept representations can be specified by using a semantic frame which represents one concept with another concept. This can ensure parsing of the relationship between phrases without preparing pattern data for enumerating variations of surface representations while carrying out semantic interpretation based on the template system. It is also possible to generate a nested semantic representation (semantic tree to be described later).

(2) The language understanding apparatus described in the paragraph (1) may take such a configuration as to further includes an access table generator that receives the input utterance data, performs parsing of the utterance content indicated by the received input utterance data to acquire a dependency relationship among morpheme sequences constituting the utterance content, and generates access table data indicating an accessibility among the morpheme sequences based on the acquired dependency relationship, wherein when making a bid for each semantic frame, the bidding section specifies, from the concept representation detected by the phrase interpreter, a concept representation corresponding to a concept corresponding to each slot of the semantic frame or a subordinate concept of that concept, and a concept representation whose slot of another semantic frame is not bidden, and bids the slot for the specified concept representation when the access table data generated by the access table generator indicates that the concept representation corresponding to the semantic frame is accessible to the specified concept representation.

In this case, it is possible to parse a relationship between phrases contained in an utterance content supplementarily using the result of parsing by a parser, thus ensuring more accurate parsing of the relationship between phrases. The expression "accessibility among the morpheme sequences" is the possibility of achievement among nodes on a dependent-structure tree.

(3) The language understanding apparatus described in the paragraph (2) may take such a configuration that the access table generator separates or combines the morpheme sequences in such a way that one of the morpheme sequences undergone the parsing includes one parsed concept representation detected by the phase interpreter, and generates the access table data using a resultant morpheme sequence.

In this case, even when the vocabulary of a domain does not match with morpheme sequences as a result of parsing, morpheme sequences an access table can be generated by adjusting the morpheme sequences according to the vocabulary. This can permit direct use of an existing parser without adjustment and ensure easy replacement of a parser.

(4) The language understanding apparatus described in the paragraph (1) may take such a configuration as to flier includes a frame combination generator that by referring to the storage section, specifies a semantic frame corresponding to the concept read by the phrase interpreter, and, when there are a plurality of semantic frames specified in correspondence to one concept, generates available semantic frame combinations, wherein the bidding section generates the slot allocation table data for each of the semantic frame combinations generated by the frame combination generator, and a scoring section that gives a score based on a state of bidding a slot for a concept representation by referring to the slot allocation table data corresponding to each of the semantic frame combinations generated by the frame combination generator, and selects a semantic frame combination used in an utterance content based on the given score.

In this case, when one concept can be represented by using a plurality of different representations (semantic frames), it is possible to parse a syntax by determining if phrases of a concept used in each of possible representations according to the bidding state of a slot appears in an utterance contents and accurately selecting which representation is used.

(5) The language understanding apparatus described in the paragraph (1) may take such a configuration that: the slot definition data further includes information on a concept representation specifying a slot; referring to the storage section, the phrase interpreter detects a concept representation included in the utterance content indicated by the received input utterance data and reads a concept or a slot corresponding to the detected concept representation: and the language understanding apparatus further includes a slot collision solving section that, when a plurality of slots of a same semantic frame are bidden for one concept representation by the bidding section, detects if another concept representation specifying a slot accompanies the concept representation in the utterance content, and, upon detecting the accompanying another concept representation, selects a slot specified by the accompanying another concept representation as a slot to be bidden for the concept representation and rewrites the slot allocation table data based on a selection result.

In this case, when a semantic frame uses different slots of the same concept, a plurality of slots can be bidden for one concept representation, but a correct slot can be selected from another concept representation accompanying the concept representation in the utterance content, and bidden.

(6) The language understanding apparatus described in the paragraph (1) may take such a configuration that: the slot definition data further includes information on a marker specifying a slot; and the language understanding apparatus further includes a slot collision solving section that, when a plurality of slots of a same semantic frame are bidden for one concept representation by the bidding section, detects if a marker accompanies the concept representation in the utterance content by referring to the storage section and, upon detecting the accompanying marker, selects a slot specified by the marker as a slot to be bidden for the concept representation and rewrites the slot allocation table data based on a selection result.

In this case, when a semantic frame uses different slots of the same concept, a plurality of slots can be bidden for one concept representation, but a correct slot can be selected from a marker accompanying the concept representation in the utterance content, and bidden.

(7) The language understanding apparatus described in the paragraph (1) may take such a configuration as to further include a slot collision solving section that, when a plurality of slots of a same semantic frame are bidden for each of a plurality of concept representations corresponding to a same concept by the bidding section, selects a slot to be bidden for each of the plurality of concept representations in such a way that an order of appearance of the plurality of concept representations in the utterance content corresponds to an order of slots indicated by information on a slot appearance order stored in the storage section, and rewrites the slot allocation table data based on a selection result.

In this case, when a semantic frame uses different slots of the same concept, a plurality of same slots can be bidden for a plurality of concept representations, but a correct slot can be selected and bidden based on rules for general utterances without parsing other phrases accompanying the concept representation in the utterance content.

(8) The language understanding apparatus described in the paragraph (1) may take such a configuration as to further include a syntax error parser that, when there is a blank slot which has not been bidden for any concept representation by the bidding section, bits the blank slot for a concept representation which matches with a concept corresponding to the blank slot and for which another slot is not bidden, and rewrites the slot allocation table data based on a bidding result.

In this case, even when a syntax error is caused by a parser, a slot can be bidden accurately for a concept representation.

(9) The language understanding apparatus described in the paragraph (1) may take such a configuration as to further include an intrasentential omission solving section that, for a concept representation which corresponds to a semantic frame and for which a slot of the semantic frame is not bidden by the bidding section, specifies another concept representation appearing before the concept representation in the utterance content and corresponding to a same concept as the concept representation, detects that the specified another concept representation and the concept representation form a parallel structure, detects that a semantic frame corresponding to the specified another concept representation has a same slot as the unbidden slot of the semantic frame corresponding to the concept representation, and, when detecting that the detected slot of the semantic frame corresponding to the specified another concept representation is bidden for a further concept representation by the bidding section, bids the unbidden slot of the semantic frame corresponding to the concept representation for the detected further concept representation and rewrites the slot allocation table data based on a bidding result.

In this case, even when an element (concept representation) mentioned at the top is omitted in second or subsequent elements in an utterance, the parallel structure can allow a slot to be bidden for the omitted concept representation, thus making it possible to supplement an omitted phrase in semantic interpretation.

(10) The language understanding apparatus described in the paragraph (1) may take such a configuration as to further include a semantic tree generator that, referring to the slot allocation table data, generates a semantic tree from a concept representation having a semantic frame and a concept representation for which a slot of the semantic frame is bidden.

In this case, a relationship between concept representations can be represented by a tree structure in terms of a semantic tree which allows parameters to be used in a task process command to be easily extracted from the slot allocation table data.

(11) The language understanding apparatus described in the paragraph (10) may take such a configuration that the semantic tree generator generates a semantic tree by arranging an enumeration of concept representations for which individual slots of a semantic frame is to be bidden at a lower node of a concept representation corresponding to the semantic frame, and, when the semantic frame corresponds to an arranged concept representation, repeating arranging the concept representations for which individual slots of the semantic frame of the arranged concept representation is to be bidden at a lower node of the arranged concept representation.

In this case, it is possible to generate a semantic tree accurately representing a relationship between concept representations indicated by the slot allocation table data.

(12) The language understanding apparatus described in the paragraph (11) may take such a configuration that the semantic tree generator arranges a single concept representation for a bidding destination when there is the single concept representation for the bidding destination or an enumeration of group nodes indicating an enumeration when there are a plurality of slots to be bidden, at a lower node of a concept representation corresponding to a semantic frame, arranges an enumeration of a plurality of concept representations for which slots corresponding to the group nodes are to be bidden, under command of the group nodes indicating the enumeration, and, when the semantic frame corresponds to an arranged concept representation, repeats a similar process for the semantic fire of the arranged concept representation to generate a semantic tree, and converts the generated semantic tree to a semantic tree having only top nodes as group nodes when there is a group node in the generated semantic tree.

In this case, even when a plurality of concept representations are enumerated for the same slot, a concept representation can be represented in the form of a semantic tree that is easily transformable to a task process command which does not take an enumeration type parameter structure.

(13) The language understanding apparatus described in the paragraph (11) may take such a configuration that when detecting a repetitive pattern including a plurality of slots in a same semantic frame, the semantic tree generator groups the repetitive patter and generates the semantic tree for each group.

In this case, even for concept representations which are determined as slots of the same semantic frame, it is possible to separate the relationship among the concept representations into groups and generate semantic trees for the different groups, respectively.

(14) The language understanding apparatus described in the paragraph (11) may take such a configuration as to further include a task representation generator that generates a task execution instruction from the semantic tree generated by the semantic tree generator.

In this case, it is possible to specify a concept representation to be a parameter to be given to a task from the generated semantic tree and instruct execution of the task.

(15) According to the present invention, there is provided a language understanding method for use in a language understanding apparatus which converts an utterance content of a natural language into a semantic representation to be used in computer processing and has a storage section that stores concept structure data indicating a correlation between a tree stricture of a concept to be used in a domain and a concept representation specifying the concept, frame definition data corresponding to a concept and indicating a correlation between one or more semantic frames for representing the concept by another concept, and one or more slots to be used in the one or more semantic frames, and slot definition data indicating a concept to be used as a slot, the method including a phrase interpreting step of receiving input utterance data detecting a concept representation included in an utterance content indicated by the input utterance data by referring to the storage section, and reading information of a concept corresponding to the detected concept representation from the storage section: and a bidding step of reading information on a slot of a semantic frame corresponding to the concept indicated by the information read at the phrase interpreting step and information on a concept corresponding to the slot by referring to the storage section, specifying, for each semantic frame read, from the concept representation detected at the phrase interpreting step, a concept representation corresponding to a concept corresponding to each slot of the semantic frame or a subordinate concept of that concept, and a concept representation whose slot of another semantic frame is not bidden, and repeating bidding the slot for the specified concept representation thereby generating slot allocation table data indicating a bidding result.

(16) A computer program according to the present invention allows a computer to be used as a language understanding apparatus to function as a storage section that stores concept structure data indicating a correlation between a tree structure of a concept to be used in a domain and a concept representation specifying the concept frame definition data corresponding to a concept and indicating a correlation between one or more semantic frames for representing the concept by another concept, and one or more slots to be used in the one or more semantic frames and slot definition data indicating a concept to be used as a slot; a phrase interpreter that receives input utterance data detects a concept representation included in an utterance content indicated by the input utterance data by referring to the storage section, and reads information of a concept corresponding to the detected concept representation from the storage section; and a bidding section that reads information on a slot of a semantic frame corresponding to the concept indicated by the information read by the phrase interpreter and information on a concept corresponding to the slot by referring to the storage section, specifies, for each semantic frame read, from the concept representation detected by the phrase interpreter, a concept representation corresponding to a concept corresponding to each slot of the semantic frame or a subordinate concept of that concept, and a concept representation whose slot of another semantic frame is not bidden, and repeats bidding the slot for the specified concept representation, thereby generating slot allocation table data indicating a bidding result.

According to the present invention, as described above, a parsing-based natural language understanding mechanism can be constructed quickly and easily by merely giving the knowledge of a domain without adjusting a parser or constructing a semantic representation generator. The language understanding apparatus and language understanding method of the present invention use parsing merely supplementarily to have the advantage of a language understanding scheme which does not uses parsing.

Apparently, the language understanding apparatus of the present invention integrates the parsing system and template system to satisfy understandable complexity and robustness at the same time, and can significantly reduce the amount of knowledge a system developer needs to describe.

BRIEF DESCRIPTION OF THE DRAWINGS

FIG. 5 is a diagram showing an example of a slot definition according to the embodiment;

FIG. 12 is a diagram showing an access table generated by the language understanding apparatus according to the embodiment;

FIG. 13 is a diagram showing a slot allocation table generated from the access table by the language understanding apparatus according to the embodiment;

FIG. 18 is a diagram showing an example of a dialogue in a dialogue system using the language understanding apparatus according to the embodiment;

FIG. 19 is a diagram showing another example of a dialogue in a dialogue system using the language understanding apparatus according to the embodiment;

FIG. 20 is a diagram showing the dialogue problem of the dialogue system using the language understanding apparatus according to the embodiment;

FIG. 21 is a diagram showing an example of a dialogue observed in a dialogue experiment of a dialogue system using the language understanding apparatus according to the embodiment;

FIG. 22 is a diagram showing another example of a dialogue observed in a dialogue experiment of a dialogue system using the language understanding apparatus according to the embodiment;

FIG. 23 is a diagram showing the numbers of successes for each problem and the total numbers of successes, and the rate of successes in a dialogue experiment of a dialogue system using the language understanding apparatus according to the embodiment;

FIG. 24 is a diagram showing the results of classification based on the acceptability of dependency for each concept representation and a frame-slot value relationship in a dialogue experiment of a dialogue system using the language understanding apparatus according to the embodiment; and FIG. 25 is a diagram showing the successful/failing results of interpretation of concept representations in a dialogue experiment of a dialogue system using the language understanding apparatus according to the embodiment.

DETAILED DESCRIPTION OF THE INVENTION

A preferred embodiment of the present invention will now be described below with reference to the accompanying drawings.

[1. Outline]

A language understanding apparatus according to the embodiment achieves parsing-based semantic representation generation (process $\alpha$ in FIG. 1) for a domain dependent language understanding apparatus including a dialogue system.

Various problems of the existing technology, particularly, problems on a semantic representation generator seem to have been brought up by parsing results too centralized in semantic interpretation. In this respect, the language understanding apparatus according to the embodiment uses parsing results supplementarily with a domain knowledge rather than the parsing results being taken as central elements in semantic interpretation. The "domain knowledge" used herein is an ontology (including a concept structure, a semantic frame which is given to each concept and defines the concept, and a language representation representing each concept), and a named entity (name of a matter which appeals in a domain).

The use of parsing this way can allow complex representations to be understood between than the scheme that uses keywords or surface pattern. While parsing uses am existing general-purpose parser, it is unnecessary to adjust the parser domain by domain. A robust language understanding apparatus is constructed quickly by emphasizing a domain knowledge and supplementarily using the result of parsing.

[2. Domain Knowledge and Semantic Representation]

First, a domain knowledge and semantic representation in the language understanding apparatus according to the embodiment will be described.

The language understanding apparatus according to the embodiment realizes a frame work which can construct a parsing system without adjusting a parser or creating a semantic representation generator once the knowledge of a domain is given.

That is, a semantic representation generating method in the language understanding apparatus according to the embodiment works within the frame work, and knowledge which can be used in semantic representation generation depends on a domain knowledge given. In this respect, a domain knowledge will be defined hereinunder. In the frame work, it is easy to describe a process of converting a semantic representation to a task representation (process β in FIG. 1).

[2.1 Ontology]

Figures 3, 4:
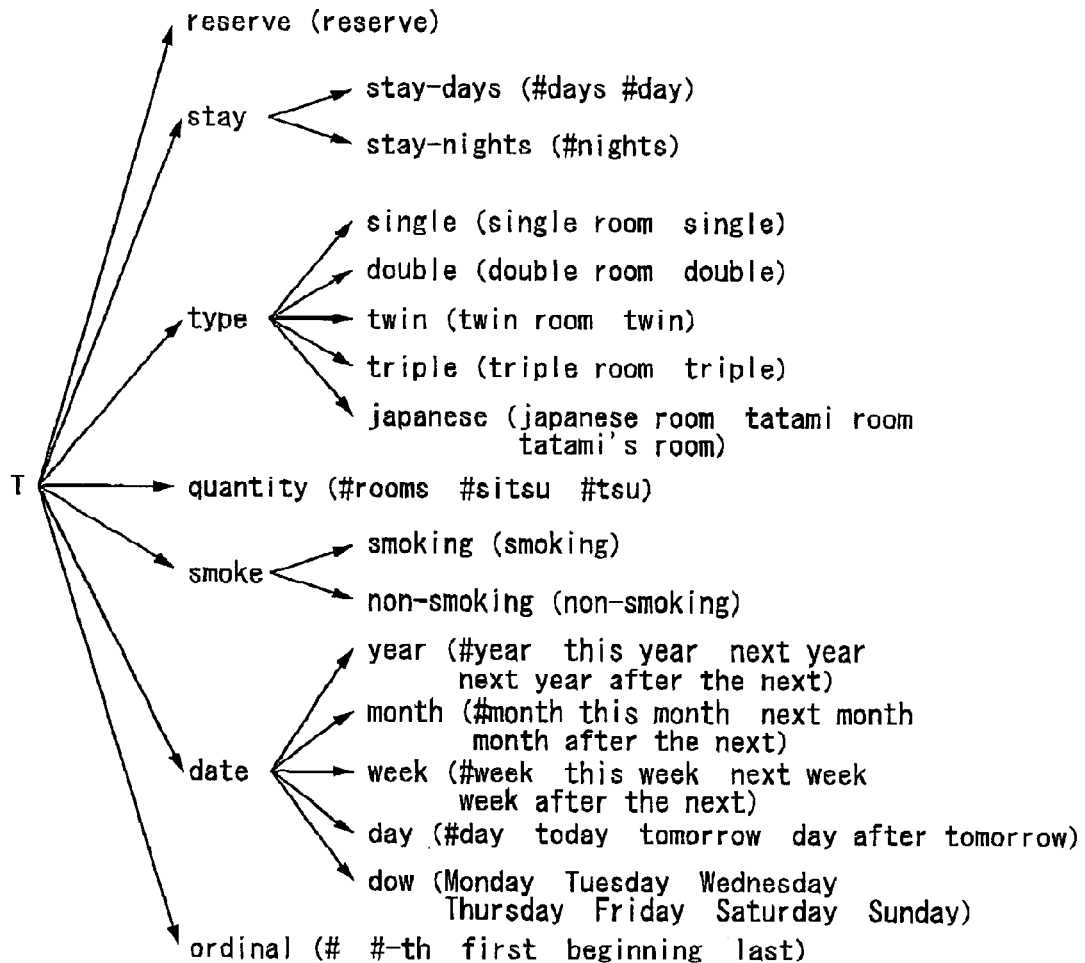
FIG. 3 is a diagram showing an example of a concept structure according to one embodiment of the present invention.
FIG. 4 is a diagram showing an example of a frame definition according to the embodiment.

In the ontology that is used in the language understanding apparatus according to the embodiment, a set of concepts defining a domain is defined by a tree structure, and a language representation and a semantic frame which correspond to each of the concepts are described. Each concept has a proper name (concept name) which specifies a single concept. If the concept is what is linguistically mentioned actually in a dialogue, the concept has a representation for indicating the concept representation or a concept representation. FIG. 3 shows an example of a concept structure for a hotel reservation system. In the diagram, each node indicates a concept name with a concept representation indicated in parentheses. A symbol "#" in the concept representation represents an arbitrary numeral sequence. In FIG. 3, concepts "reserve", "stay", "type", "quantify", "smoke", "date", and "ordinal" are subordinate to a topmost node "T". A language representation "reserve" is associated with the concept "reserve". The concept "stay" has subordinate concepts "stay-days" and "stay-nights". Language representations "#days" and "#day" are associated with the concept "stay-days", and a language representation "#nights" is associated with the concept "stay-nights".

Further, each concept has one or more semantic frames defining the concept. A semantic frame is semantic representation means which represents a concept with a set of variables (slots) and values thereof. FIG. 4 shows a semantic frame definition of the concept "reserve" (see FIG. 3). Defining a plurality of semantic frames can allow the same content to be accepted with designation of different parameters. For example, variations of expressions to designate a date by a day of a week ("third Sunday of the next month", "next Sunday", etc.) can be solved by defining a plurality of semantic frames (each also hereinafter described simply as "frame").

In FIG. 4, the concept "reserve" has two semantic frames "reserveF0" and "reserveF1", "reserveF0" taking parameters or slot names "start", "stay", "type", "quant" and "smoke". Accordingly, it is possible to accept a representation "reserve single, non-smoking, for three nights from 23". "reserveF1" takes parameters or slot names "start", "end", "type", "quant" and "smoke" as parameters. Accordingly, it is possible to accept a representation "reserve a single, non-smoking, from 23 to 26".

In the definition of a slot shown in FIG. 5, there are five parameters, a slot name, target concept, slot designation, marker, and clarification demand representation. A target concept can be the value of a slot. When a concept having a concept structure is designated, the concept and its subordinate concept can become slot values. Slot designation is a language representation used when a slot whose value is a certain concept representation is designated. For example, "check in" is slot designation in case of "check in on 25". A maker also characterizes which language representation is the value of which slot.

In the case of Japanese, a marker follows a language representation to be marked and is of a functional word. A marker, which is less clarified than slot designation, is given as a part of a domain knowledge when one language representation is effective in designating a slot. Otherwise, for example, particle "ha" or the like need not be given.

A clarification demand representation is used for a dialogue system provided in the language understanding apparatus to inquire a user when a slot value is indefinite, and does not affect semantic representation generation. When a clarification demand representation is not given, the dialogue system uses a default value without inquiry. A default value can be defined in the language understanding apparatus by an arbitrary setting scheme.

FIG. 5 shows slot definition of the concept "reserve", and the slot name "start" indicates that the target concept is "date", and the slot designation is "check in", the marker is "from", and the clarification demand representation is "from when do you stay?". The slot name "stay" indicates that the target concept is "stay", the slot designation is "the number of staying nights" and "the number of days", and the clarification demand representation is "how many nights do you stay?".

To execute an application by using a language understanding frame work to realize the language understanding apparatus of the embodiment, a concretization function to convert a content representing a semantic frame at the time of defining the semantic frame into concrete information is defined, and implementation of the concretization function is given by a general-purpose programming language. Then, mapping from the semantic frame to the concretization function is designated. While an arbitrary concretization function can be used, only a concretization function is a key to convert the semantics of a word into a machine understandable form, and is needed at the beginning of the process β (task representation generation) in FIG. 1. When the number of staying days is designated as "three nights", for example, it is converted to an integer of "3" by a concretization function corresponding to the sole semantic frame of the concept "stay-nights". When the number of staying days is designated as "four days", it is converted to an integer of "4" by a concretization function corresponding to the sole semantic frame of the concept "stay-days".

A knowledge of the combination of a semantic frame and mapping to a concretization function to convert from the semantic frame to a task representation in the embodiment is equivalent to a keyword pattern in Non-patent Document 1 of the related art. A knowledge equivalent to a concretization function itself in the embodiment is embedded in a problem solving unit of the system in Non-patent Document 1 of the related art.

[2.2 Pronoun Representation]

Next, a pronoun representation will be described.

There are instances of a concept (class) defined in the ontology in a domain and some instances have names. A representation (name) which indicates each instance, not a concept, is called "pronoun representation".

A pronoun representation is defined while being associated with each instance at the time of defining the instance. A pronoun representation should not necessarily indicate a sole instance. This should be apparent from an example where there are many people with the same name. It is a specific character sequence called an instance symbol which makes each induce identifiable and is set when defining each instance. The instance symbol becomes an element constituting a semantic representation and task representation, and is finally used by a task processing module.

[2.3 Semantic Tree]

A semantic tree will be described below.

Figure 6:
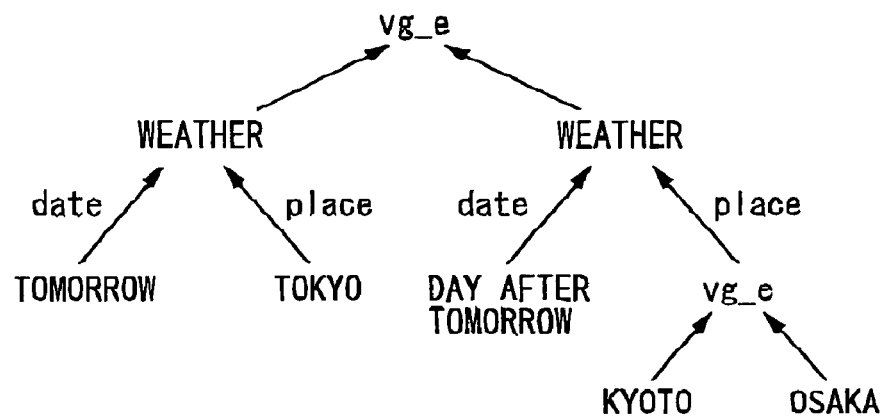
FIG. 6 is a diagram showing an example of a tree structure representation of a semantic frame according to the embodiment.

A semantic tree is defined as the form of a semantic representation output from a semantic representation generator. A semantic tree is a nesting structure of semantic frames as shown on the right-hand side of FIG. 2 expressed by a tree structure as shown in FIG. 6.

A semantic tree has two kinds of nodes, a content node and a group node. Either node can take the two kinds of nodes as its child node.

A content node refers to a partial representation corresponding to the node in an input representation and holds a concept represented by a partial representation. The content node holds an instance symbol when the node indicates an instance in a domain, and a frame defining the concept otherwise. The maximum number of child nodes for one content node is the number of slots a frame represented by the node has. A child node represents a slot value.

Group nodes each represent a parallel structure and are separated into an enumeration type and a replacement type. The number of child nodes of a group node is not limited. A group node saves, as the order of child nodes, an appearance order of individual elements of a parallel structure on a surface layer.

A semantic tree shown in FIG. 6 is generated from the following example 1.

"weather in Tokyo tomorrow and in Kyoto and Osaka day after tomorrow"

EXAMPLE 1

In FIG. 6, "vg_e" represents an enumeration type group node. Each content node is represented by a language representation (concept representation or pronoun representation) corresponding to the content node. In the diagrams, two language representations "weather" are enumerated at the topmost node, and a language representation "tomorrow" of a concept "date" and a language representation "Tokyo" of a concept "place" are applied to one language representation "weather". A language representation "day after tomorrow" of the concept "date" and a group node "vg_e" having an enumeration of language representations "Tokyo" and "Osaka" of the concept "place" are applied to the other one language representation "weather".

[4. Configuration of Language Understanding Apparatus]

Next, the configuration of the language understanding apparatus according to the embodiment will be described.

Figure 7:
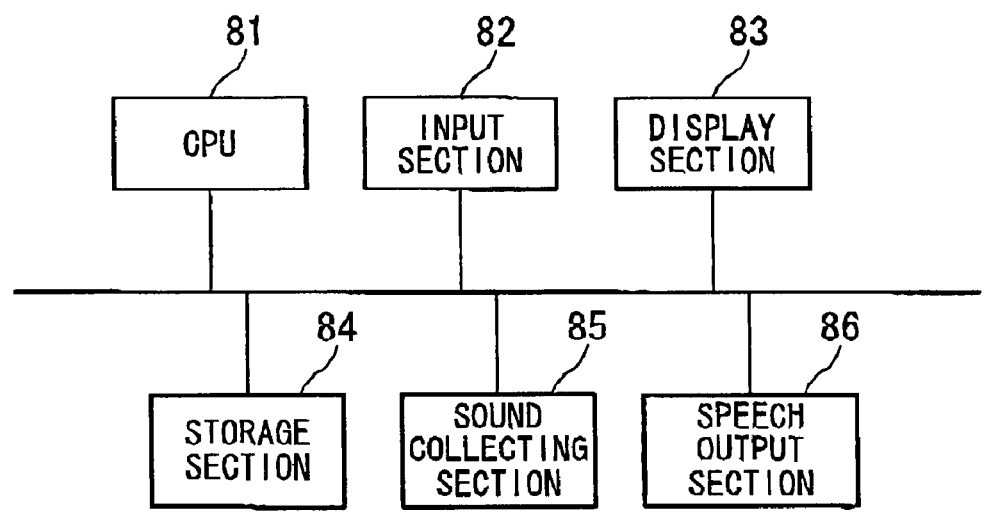
FIG. 7 is a diagram illustrating the hardware configuration of a language understanding apparatus according to the embodiment.

FIG. 7 is a diagram illustrating the configuration of a language understanding apparatus 1, and shows only those extracted components which are relevant to the present invention. In the diagram, the language understanding apparatus 1 includes a CPU (Central Processing Unit) 81, an input section 82, a display section 83, a storage section 84, a sound collecting section 85, and a speech output section 86.

The CPU 81 is a central processing unit which performs operations and control. The input section 82 is a mouse, a keyboard and so forth. The display section 83 is a display like an LCD (Liquid Crystal Display). The storage section 84 has a ROM (Read Only Memory) where a system program or the like is stored, a RAM (Random Access Memory) having a work area used when the CPU 81 executes various programs, and a hard disk to store programs for executing individual application processes. The sound collecting section 85 is a microphone or the like to collect sounds. The speech output section 86 is a speaker or the like to output sounds.

Figure 8:
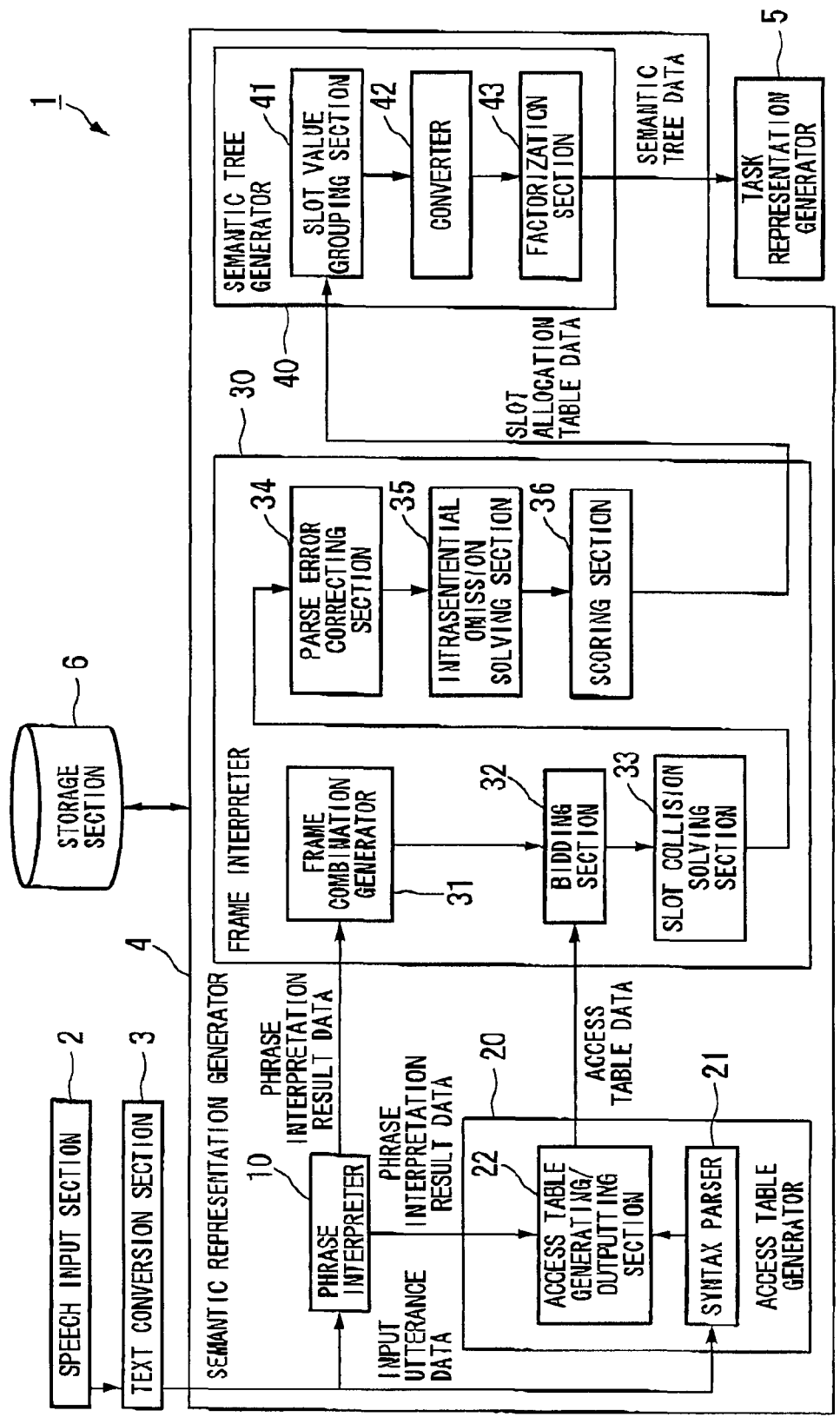
FIG. 8 is a functional block diagram of the language understanding apparatus according to the embodiment.

FIG. 8 is a functional block diagram showing the configuration of the language understanding apparatus 1, and shows only those extracted functional blocks which are relevant to the present invention. The language understanding apparatus 1 has a speech input section 2, a text conversion section 3, a semantic representation generator 4, a task representation generator 5, and a storage section 6. The text conversion section 3, the semantic representation generator 4 and the task representation generator 5 are realized as the CPU 81 reads and executes some corresponding programs stored in the storage section 84.

The storage section 6 stores concept structure data, frame definition data and slot definition data as ontology data.

The concept structure data is data representing a concept structure as shown in FIG. 3, and shows a tree structure including a set of concepts defining a domain and information on language representations corresponding to those concepts. Each concept is indicated by a concept name as a pronoun name which specifies only the concept. When a concept is what is linguistically mentioned acrually in a dialogue, the concept structure data includes a concept representation for instructing the concept.

The frame definition data is data representing a frame definition as shown in FIG. 4, and includes a concept name and one or more semantic frames corresponding to the concept name. One or more parameters are used in a semantic frame. Each parameter is provided with one or more slot names.

The slot definition data is data representing a slot definition as shown in FIG. 5, and indicates a slot name, a target concept, a slot designation, a marker, and a clarification demand representation. The target concept is a concept representation to be a slot value which is indicated by a concept name. The slot designation indicates a language representation which is used at the time of designating a slot whose value is to be one concept. The marker characterizes which language representation is the value of which slot. The clarification demand representation is used to inquire a user when a slot value is indefinite.

The speech input section 2 accepts an input of an utterance content from the sound collecting section 85. The text conversion section 3, which is realized by, for example, general-purpose speech recognition software, converts an utterance content input by the speech input section 2 into a text. The semantic representation generator 4 receives an input of input utterance data indicating the input utterance content converted into a text by the text conversion section 3, and converts the input in a natural language representation to a semantic representation (equivalent to the process α in FIG. 1). The semantic representation generator 4 may receive an input of input utterance data indicating an utterance content directly input by the input section 82. The task representation generator 5 generates a task representation for instruction execution of a task process application from the semantic representation generated by the semantic representation generator 4 by using a concretization function for converting a semantic representation into concrete information which a task process module of an application system can understand and outputs the task representation to an execution section (not shown) of the task process application (process β in FIG. 1). Note that the concretization function can be implemented by a general-purpose programming language. For example, the task representation generator 5 generates, as a task representation, a target state (goal) to be an input of a task planner in a robot dialogue or a SQL sentence in a database search dialogue. It is assumed herein that the task representation generator 5 uses an existing technology for the process of converting a semantic representation into a task representation.

The semantic representation generator 4 has a phrase interpreter 10, an access table generator 20, a frame interpreter 30, and a semantic tree generator 40.

The phrase interpreter 10 extracts a description of a concept or matter from an input utterance content of a natural language indicated by the input utterance data input from the text conversion section 3.

The access table generator 20 includes a syntax parser 21 and au access table generating/outputting section 22.

An existing parser can be used for the syntax parser 21, which performs parsing based on the input utterance content of a natural language indicated by the input utterance data input from the text conversion section 3. The access table generating/outputting section 22 generates an access table from the result of parsing performed by the syntax parser 21 and the result of phrase interpretation performed by the phrase interpreter 10. The access table shows parsing results representing the distance between phrases obtained as a result of parsing in the form of a matrix.

The frame interpreter 30 determines combinations of frames and slot values by referring to data in the access table generated by the access table generator 20, and outputs slot allocation table data having the determined combinations to the semantic tree generator 40. The frame interpreter 30 has a frame combination generator 31, a bidding section 32, a slot collision solving section 33, a parse error correcting section 34, an intrasentential omission solving section 35, and a scoring section 36.

The frame combination generator 31 generates all combinations for frames corresponding to individual concept representations included in the phrase interpreting result data input from the phrase interpreter 10. The bidding section 32 allocates slot values to frames for all the frame combinations generated by the frame combination generator 31 by referring to the access table data output from the access table generating/output section 22, and generates a slot allocation table obtained by writing (bidding) the allocation results in a table representing the relationship between concept representations in a matrix form. The slot collision solving section 33 selects and allocates a correct slot to a concept representation bidden as a plurality of slot values in the slot allocation table generated by the bidding section 32. The parse error correcting section 34 corrects an error in a parsing result, and allocates a correct slot to a concept representation to which a slot to be allocated is not allocated. The intrasentential omission solving section 35 allocates a slot to a concept representation in the slot allocation table to which no slot is allocated because the concept representation is a phrase omitted due to the parallel structure. The scoring section 36 makes a score to evaluate whether adequate slots are used in the slot allocation table of all the frame combinations generated by the frame combination generator 31. The scoring section 36 outputs slot allocation table data of the most adequate frame combination to the semantic tree generator 40.

The semantic tree generator 40 generates a semantic tree from the result of frame interpretation indicated by the slot allocation table data input from the frame interpreter 30. The semantic tree generator 40 has a slot value grouping section 41, a converter 42 and a factorization section 43.

The slot value grouping section 41 detects a repetitive pattern including a plurality of slot values, and groups and separates the slot values. The converter 42 converts the slot allocation table into a semantic tree. The factorization section 43 expands a content node having a group node as a child node in the semantic tree generated by the converter 42 so that the content node can be mapped into a concretization function, and outputs the expanded content node to the task representation generator 5.

[5. Processing Operation of Language Understanding Apparatus]

Next, the operation of the language understanding apparatus 1 will be described.

Figure 9:
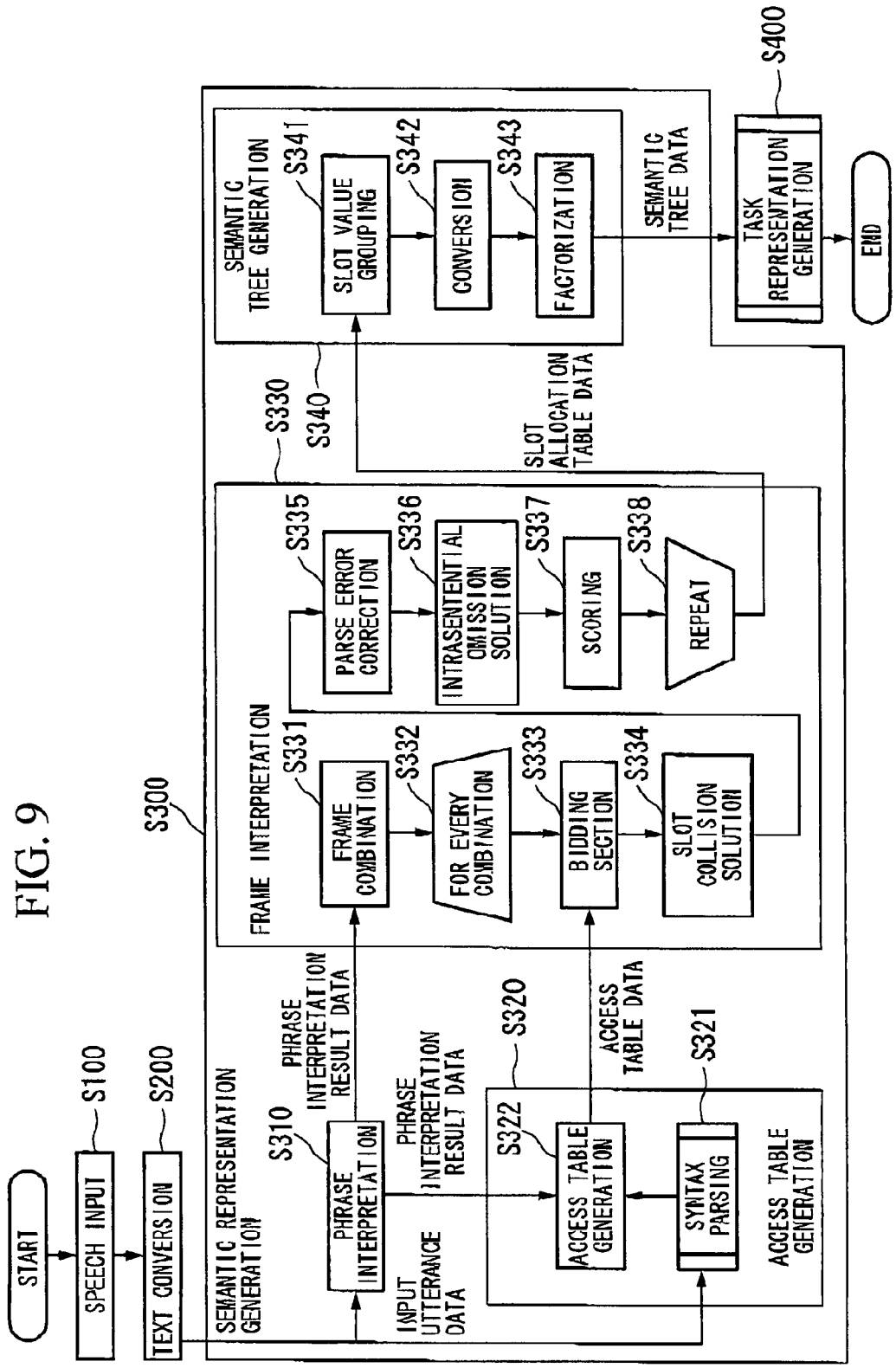
FIG. 9 is a diagram illustrating a process flow of the language understanding apparatus according to the embodiment.

FIG. 9 is a diagram illustrating a process flow of the language understanding apparatus 1.

In the diagram, first, a speech is input to the speech input section 2 of the language understanding apparatus 1 (step S100). The text conversion section 3 recognizes the speech input to the speech input section 2, generates input utterance data indicating an input utterance content by a text, and outputs the input utterance data to the semantic representation generator 4 (step S200). Input utterance content data indicating an utterance content directly input from a keyboard or the like may be output to the semantic representation generator 4.

A semantic representation generation process to generate semantic tree data including an input utterance content indicated by the input utterance data (step S300) has the following four processes.

(Step S310) Phrase Interpretation:

A description of a concept or matter is extracted from an input representation.

(Step S320) Generation of Access Table:

Parsing is carried out and the parsing result is adjusted according to the result of the phrase interpretation.

(Step S330) Frame Interpretation:

Combinations of frames and slot values are determined based on the access table.

(Step S340) Generation of Semantic Tree:

A semantic tree is generated from the frame interpretation result.

Figure 1:
FIG. 1 is a simplified exemplary diagram of natural language understanding.

The semantic representation generation process in step S300 is equivalent to the process α in FIG. 1.

Figure 2:
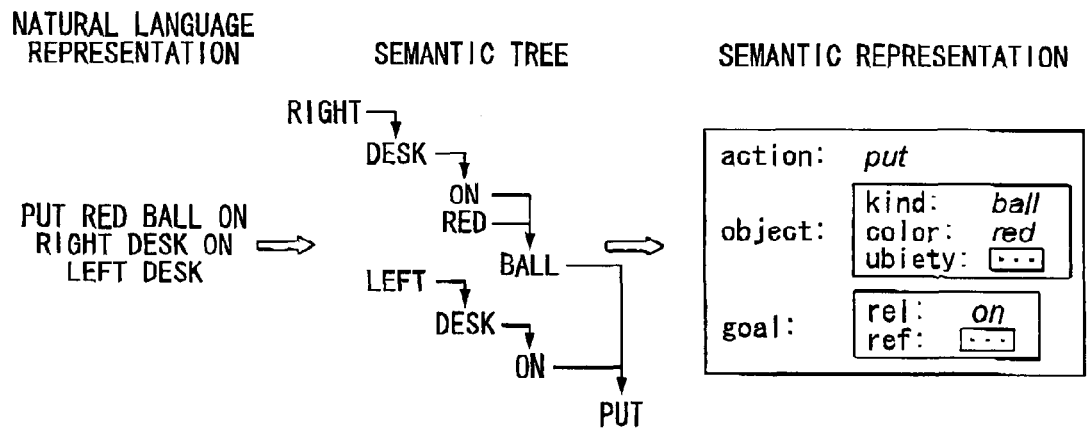
FIG. 2 is an exemplary diagram of a general parsing system.

It is to be noted however that the process is not a pure cascade process as shown in FIG. 2. While the processes of the steps S310 to S340 appear to be a cascade process, the processes in steps S310, S330 and S340 are substantially cascaded. While the access table generation process in step S320 needs the result of the process of step S310 at the output time, the parsing itself is in parallel to step S310.

The details processes of steps S310 to S340 will be described below.

[5.1 Phase Interpretation]

In step S310, the phrase interpreter 10 of the language understanding apparatus 1 performs a language-dependent normalization process on the input the utterance content indicated by the input utterance data. This process is a format conversion process of converting a Kanji numeral to an Arabic numeral and writing a date in case of Japanese.

Next, the phrase interpreter 10 performs pattern matching on the input utterance content, undergone the format conversion process, by a normalization representation. In pattern matching, a concept representation, a slot designation and a pronoun representation indicated by the concept structure data and slot definition data stored in the storage section 6 are targets as a domain knowledge. As it is possible at this time that a plurality of patterns match with a partial character sequence, the phrase interpretation outputs a set of matching results which provides the maximum coverage without overlapping. A keyword matching system which is one kind of template systems executes language understanding with this process alone.

Figures 10, 11:
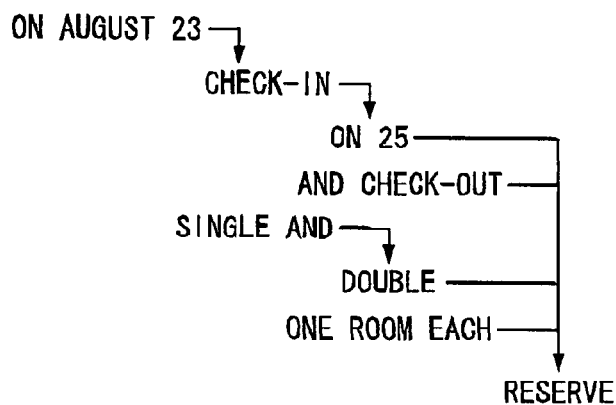
FIG. 10 is a dial showing an example of the result of phrase interpretation of the language understanding apparatus according to the embodiment.
FIG. 11 is a diagram showing a parse tree generated by the language understanding apparatus according to the embodiment.

FIG. 10 shows the result of phrase interpretation of the representation of an input utterance content after format conversion, "reserve single and double one room each with check-in on August 23 and check-out on 25" (Example 2) the language understanding apparatus according to the embodiment.

The phrase interpreter 10 searches the concept structure data (FIG. 3) and slot definition data (FIG. 5) registered in the storage section 6, and detects that the concept structure data contains a concept representation "#month" which matches with the first phrase "August" in the Example 2. The phrase interpreter 10 generates data in which "(1)" indicating that the phrase is the first one matched in the input utterance content, a matched concept representation "August" in the input utterance content, matching of "concept" and a concept name "month" of the matched concept are associated with one another.

The phrase interpreter 10 performs further searching to detect that the concept structure data contains a concept representation "#day" which matches with the next phrase "23" in the Example 2. The phrase interpreter 10 generates data in which "(2)" indicating that the phrase is the second one matched in the input utterance content, a matched concept representation "23" in the input utterance content, matching of "concept" and a concept name "day" of the matched concept are associated with one another.

The phrase interpreter 10 performs further searching to detect that the slot definition data contains a slot designation which matches with the next phrase "check in" in the Example 2. The phrase interpreter 10 generates data in which "(3)" indicating that the phrase is the third one matched in the input utterance content, a matched concept representation "check in" in the input utterance content, matching of "slot designation" and a slot name "start" of the matched slot are associated with one another.

The phrase interpreter 10 repeats the above-described processes to perform phrase interpretation through a pattern matching process on the input utterance content, generates data indicating a phrase interpretation result as show in FIG. 10, and outputs the data to the access table generator 20 and the frame interpreter 30.

[5.2 Access Table Generation]

In step S320 in FIG. 9, the access table generator 20 of the language understanding apparatus 1 executes processes of the following steps S321 to S322.

[5.2.1 Parsing]

The syntax parser 21 of the access table generator 20 parses the input utterance content indicated by the input utterance data input thereto (step S321). An arbitrary parser such as existing parsing software can be used for the syntax parser 21. FIG. 11 shows a parse tree as a result of parsing the input utterance content in the Example 2. In the diagram "August 23" is applied to "check in" which is applied to "25", and "single and" is applied to "double". Further, "25", "check out", "double" and "one each" are applied to "reserve".

[5.2.2 Access Table Generation]

Next, the access table generating/outputting section 22 of the access table generator 20 generates an access table based on the result of parsing by the syntax parser 21 (step S322). The access table shows the parsing results (the top one when there are a plurality of candidates) in a matrix form, and represents whether there is a path between two phrases or nodes of the syntax tree. While a dependency structure is used as the parsing results, a parser which uses a phrase structure grammar may be used since it is easy to convert a phrase structure to a dependency structure.

Because of the use of a general-purpose parser for the syntax parser 21, the vocabulary of a domain may not match with the (morpheme sequence premised on) parsing results. Accordingly, the access table generating/outputting section 22 generates an access table by adjusting the parsing results according to the result of the phrase interpretation in the phrase interpreter 10.

When one node (parsing unit) in the syntax parser 21 includes one concept representation (phrase) detected by the result of the phrase interpretation in the phrase interpreter 10, for example, the node and the concept representation are assumed to correspond to each other. When one node (segment) in the syntax parser 21 includes a plurality of concept representations detected by the result of the phrase interpretation in the phrase interpreter 10, the concept representations are separated into concept representations detected by the phrase interpretation result. Although "August 23" is treated as one segment in the syntax parser 21, for example, "August" and "23" are separate concepts in the definition of concept structure data shown in FIG. 3, and are parsed as different concept representations in the phrase interpretation result data output from phrase interpreter 10. Accordingly, the access table generating/outputting section 22 separates "August 23" into two segments "August" and "23". When a plurality of consecutive concepts are put together into a single dependency structure parsing unit in this manner, the dependency destination of the parsing unit is the dependency destination of the rightmost concept (concept representation appearing previously in the input utterance content), and other concepts are considered to be reachable to a right concept by a distance 1. When a single concept is separated into a plurality of dependency structure parsing units, on the other hand, the dependency destination of the rightmost parsing unit (concept representation appearing later in the input utterance content) is the dependency destination of the concept. If other parsing units are present in another concept, they are neglected. The concept which has been separated into a plurality of dependency structure becomes the dependency destination of all the concepts dependent on an arbitrary parsing unit.

FIG. 12 shows an access table generated from the syntax tree in FIG. 11 and the phrase interpretation result shown in FIG. 10. What is indicated by the phrase interpretation result data input from the phrase interpreter 10 is used as concept representations constituting the rows and columns of the access table shown in FIG. 12. The parsing result and the access table compared with each other show that a numeral written at the intersection of a x row and a y column in the table represents a distance (path length on a tree structure) by which a concept representation indicated in the x row reaches a concept representation indicated in the y column. A blank portion means "0" indicating an unreachable. For example, "double" can reach "single" by the distance 1. "reserve" reaches "25", "check out", "double", and "one room" by the distance 1, "check in" one level higher than "25" and "single" one level higher than "double" by a distance 2, reaches "23" one level higher than "check in" by a distance 3, and reaches "August" one level higher than "23" by a distance 4.

The access table generating/outputting section 22 outputs the generated access table data to the frame interpreter 30

[5.3 Frame Interpretation]

In step S330 in FIG. 9, the frame interpreter 30 of the language understanding apparatus 1 determines allocation of frames corresponding to individual concepts extracted in the phrase interpretation, and slots by referring the access table data. Specifically, the following processes of steps S331 to S338 are executed

[5.3.1 Frame Combination Generation]

Upon reception of the input of phrase interpretation result data from the phrase interpreter 10, the frame combination generator 31 of the frame interpreter 30 searches for frame definition data corresponding to each of all concepts included in the phrase interpretation result data by referring to the storage section 6, and reads frame definition data if any. Then, the frame combination generator 31 generates combinations from all available frames by referring to the read frame definition data (step S331).

Although FIG. 4 shows only frames for a concept "reserve", a plurality of frames can be defined for each concept. Which frame actually corresponds to a concept representation in an input utterance cannot be determined unless how many slots corresponding to a frame are filled is evaluated, and cannot therefore be known beforehand. Accordingly, all combinations when individual concept representations take different frames respectively are generated. When concept names "and" are included in the phrase interpretation result data, and frame definition data indicated by the that "xF0" and "xF1" are frames corresponding to the concept name "x", and "yF0" and "yF1" are frames corresponding to the concept name "y" is registered in the storage section 6 as the frame definition data, frame combinations (xF0,yF0), (xF0,yF1), (xF1,yF0) and (xF1,yF1) are generated.

In the case of the Example 2, only "reserve" has a plurality of frames, so that there are only combinations to be generated either the frame "reserveF0" or "reserveF1" specified by the concept name "reserve" of "reserve". The frame interpreter 30 performs the subsequent frame interpretation process for each frame combination (step S332). Note that only one semantic representation is generated from one frame combination. In the case of the Example 2, therefore, the frame interpreter 30 finally generates two parsing results.

[5.3.2 Bidding]

In step S333 in FIG. 9, the bidding section 32 of the frame interpreter 30 performs a bidding process to demand each slot value frame by frame. A concept which appears in an input utterance normally becomes the value of one slot of a frame of another concept which appears in the same input utterance. Accordingly, the bidding section 32 of the language understanding apparatus 1 performs the bidding process to extract the possibility of one concept representation becoming the slot value of which one of other concepts. The bidding section 32 bids a slot value for each frame by using a slot allocation table of the same type as the access table. A location where each frame can be bidden is where a numeral equal to or greater than "1" is written at a corresponding location in the access table.

FIG. 13 shows a slot allocation table as a result of bidding based on the access table shown in FIG. 12. Note that the slot designation ("check in", "check out" in the Example 2) is omitted for it is not relevant. Each row of the table represents a frame and a slot value thereof.

It is assumed that frame definition data in which a frame "dayF0" corresponding to a concept "day" has a slot "month" whose value takes a concept "month" as a parameter is stored in the storage section 6. The third row in FIG. 13 shows a content bidden for a concept representation "23" of the concept "day". When detecting that the frame "dayF0" is stored in the storage section 6 in correspondence to the concept "day" of the concept representation "23" in the third row, and has the slot "month" of the concept "month", the bidding section 32 bids, in "August", the slot "month", which matches with the concept representation of the concept "month" and whose distance is not 0.

The eighth row represents a bidding content of the second frame "reserveF1" of the concept "reserve". According to the frame definition data (FIG. 4) read from the storage section 6, present invention, "reserveF1" has both the slot "start" and slot "end" which take the concept "date" as a slot value. Therefore, the bidding section 32 bids, in both "23" and "25", the slot "start" which matches with the concept representation of the concept "date" and whose distance is not 0.

When the same concept representation is a bidding target for a plurality of frames the bidding section 32 bids only the most closest one on the dependency structure (one having the minimum value in the access table). As shown in FIG. 13, therefore, the frame of the concept representation "25" of the concept "day" is not bidden for "August" the slot allocation table. Actually, the frame of "25" should take "August" as a slot value, which is compensated for in an intrasentential omission solving process to be described later. The provision of such cons at the bidding stage prevents erroneous interpretation (inadequate bidding).

[5.3.3 Slot Collision Solution]

Next, the slot collision solving section 33 of the frame interpreter 30 executes a slot collision solving process for solving a location (slot collision) in the slot allocation table generated by the bidding section 32 where bidding for a plurality of slot values is carried out (step S334).

That is, it is assumed on the exclusiveness of a semantic role (frame slot) in which one item does not have two or more semantic roles, and one concept representation (item) can become only one slot value of a frame represented by another concept representation. Therefore, the slot collision solving section 33 solves a location (slot collision) where bidding for a plurality of slot values is carried out in each row of the slot allocation table. In case of FIG. 13, the third column and the fourth column in the last row are such locations.

Specifically, the slots "start" and "end" are bidden for the third column "23" in the last row "reserve", and the slots "start" and "end" are likewise bidden for the fourth column "25".

The slot collision solving section 33 execute slot collision solution according to the following three standards.

(1) Slot Designation:

There is a case where an input language representation expresses that one concept representation is the value of a specific slot. When such expression (slot designation) is present, the expressed slot is used. As shown in FIG. 10, in the Example 2, "check in" designates the slot "start" having a value "23" and "check out" designates the slot "end" having a value "25".

While it is not so easy to specify which concept representation one slot designation modifies, the slot collision solving section 33 determines a slot designation designates a left to the slot designation in the embodiment based on simple heuristics (empirical rules) on the surface layer where a semantic structure is neglected.

(2) Marker:

The slot collision solving section 33 checks if there is a representation (normally a function word like case particle) marking a concept representation of interest through normalized representation matching on an input utterance. If there is a marker, a slot corresponding to the marker is used. Suppose that the slots "start" and "end" are bidden for the concept representation "23" and a functional word "from" accompanies the concept representation "23". Then, because the marker "from" is associated with the slot "start" in the slot definition data shown in FIG. 5, the slot of the concept representation "23" immediately before the marker "from" is determined to be "start".

(3) Slot Definition Order:

When there is neither slot designation nor a marker, slot values are distributed in the order of description of the slots in the frame definition. Japanese is said to generally have a flexible word order, which is however known to have a certain general tendency. This word order is coded as an order in defining slots. In case of hotel reservation, for example, there is an acknowledged tendency such that a start date of staying nights is designated first, followed by designation of an end date of the staying nights. It is therefore assumed that the slot name "start" comes before the slot name "end". Accordingly, the slot name "start" is defined in the frame definition data to come before the slot name "end", and when there are two concept representations having both slots "start" and "end" bidden, the slot "start" is assigned to a concept representation in an input utterance content which appears earlier, and the slot "end" is assigned to a concept representation which appears later.

[5.3.4 Parse Error Recovery]

In step S335 in FIG. 9, the parse error correcting section 34 of the same interpreter 30 corrects a parse error and generates a slot allocation table as a result of the correction. The result of parsing performed by the syntax parser 21 in step S321 may not be accurate. When a general-purpose parser not designed for a target domain is used, particularly, results which are semantically in error, not grammatically, increase. Some of such errors are corrected here. Errors are correctable when the dependency destination of one word in a dependency structure tree becomes a word closer to a root than the intended dependency destination. In such a case, the intended dependency destination cannot access the word.

Let us consider the following Example 3.

"teach highest temperature in Tokyo between last June and August" (Example 3)

Parsing the expression of the Example 3 may result in that the part "last June and" depends on "teach", not on "between", "Tokyo and "highest temperature". In this case, the frame of the concept representation "highest temperature" should be the concept representation "June" or the slot "start", which is left empty for "June" cannot be accessed as it is. Then, the part "last June and" is neglected.

If there is a concept representation (or a pronoun representation) which has no slots with empty values and has not been bidden yet up to that stage and the concept representation (or pronoun representation) can be empty slot values, bidding for the representation is permitted. That is, when frame definition data showing that the frame of the concept representation "highest temperature" has the slot "start" whose target concept is "date" as a parameter is stored in the storage section 6, and it is determined that the slot "start" of the concept representation, "highest temperature" are not bidden in the slot allocation table input from the slot collision solving section 33, and no bidding has been done for the concept representation "June" of the target concept "date", the parse error correcting section 34 generates a slot allocation table which has the slot "start" of the concept represenatation "highest temperature" bidden for the concept representation "June".

A plurality of slots may demand bidding for a single concept representation. In this case, a syntax structure cannot be used (for it is wrong), solution is not easy. Therefore, the parse error correcting section 34 determines whether a concept representation is a target concept of an unbidden slot to decide a bidding destination by referring to a marker in the frame definition data in the storage section 6.

When there are a plurality of unbidden concept representations which match with the target concept at this time, a heuristic process is performed in which priority is given to the first slot defined in the frame which appears to the leftmost in a language representation.

[5.3.5 Intrasentential Omission Solution]

In step S336 in FIG. 9, the intrasentential omission solving section 35 of the frame interpreter 30 performs an intrasentential omission solving process to bid for a slot unbidden in the slot allocation table generated by the parse error correcting section 34 due to a parallel structure.

In a parallel structure, omission occurs frequently. Omission is a phenomenon such that a content which is described in the top element in the parallel structure is omitted in second and subsequent elements. This omission, as distinguished from a conversational omission which occurs for the omitted part has been designated vu a previous utterance or an omission based on common sense or a domain knowledge, is called "intrasentential omission".

For example, in the Example 3, "last June and" and "August" have a parallel structure, but designation of "last" is omitted in "August". Such an intrasentential omission is solved here. The intrasentential omission solving section 35 considers that a plurality of representations are in parallel in the following two cases.

(1) The representations are the value of the same slot of a frame of one concept representation.

(2) Each representation is the value of a slot which is in relation to "start-end" of a frame of one concept representation.

An example of the case (1) is "single" and "double" in the Example 2 (see FIG. 13). According to the frame definition data stored in the storage section 6, only one slot "type" is taken as a parameter for the second frame "reserveF1" of the concept "reserve". In FIG. 13 (slot allocation table when the concept "reserve" is the second frame "reserveF1"), however, the bidding destination of the slot "type" is the concept representations "single" and "double". Therefore, the intrasentential omission solving section 35 determines that "single" and "double" are in parallel.

An example of the case (2) is "23" and "25" in the Example 2 and "June" and "August" in the Example 3. While the number of concept representations to be in parallel is not limited in the case (1), they are limited to two concept representations in the case (2). Although it is appropriate to give which slots have a relation of start and end as a domain knowledge, it is currently considered that a slot having the maker "from" and a slot which takes the value of the same concept as the former slot are in parallel.

When one concept representation e is considered in parallel to a concept representation d to the left thereof there is an empty slot of the frame corresponding to the concept representation e, and there is a representation for which the same slot as the frame corresponding to the concept representation d is bidden, the intrasentential omission solving section 35 bids the slot for the concept representation e too. Let us consider a case (i) where the concept representation e is in parallel to another concept representation d to the left thereof, a case (ii) where only a slot s3 in slots s1, s2, s3, s4 of a frame f1 corresponding to the concept representation e has a slot value (is bidden for one concept representation), and a case (iii) where a frame f0 has the same slots s1, s2 as the frame f1 having the slots s1, s2, s3, s4. In this case, among the non-bidden slots s1, s2, and S4 of the frame f1, the frame f0 has the same slots s1 and s2, and the slots s1 and s2 have the slot value; therefore, the slot s1 of the frame f1 is bidden for the same concept representation as that of the slot s1 of the frame f0, and the slot s2 of the frame f1 is bidden for the same concept representation as that of the slot s2 of the frame f0.

In the case of the Example 2, the intrasentential omission solving section 35 detects the concept representation "23" which has the same concept "day" as the concept representation "25" and appears before the concept representation "25". Further, the concept representation "25" accompanies the slot designation "end", and the concept representation "23" accompanies the slot designation "start". Accordingly, the intrasentential omission solving section 35 determines that the concept representations "25" and "23" are in parallel. Although the slot "month" of the concept representation "25" is unbidden, the intrasentential omission solving section 35 detects that the slot "month" of the concept representation "23" is bidden for the concept representation "August". Accordingly, the intrasentential omission solving section 35 bids the slot "month" of the concept representation "25" for the concept representation "August" as done for the concept representation "23".

Figures 14, 15:
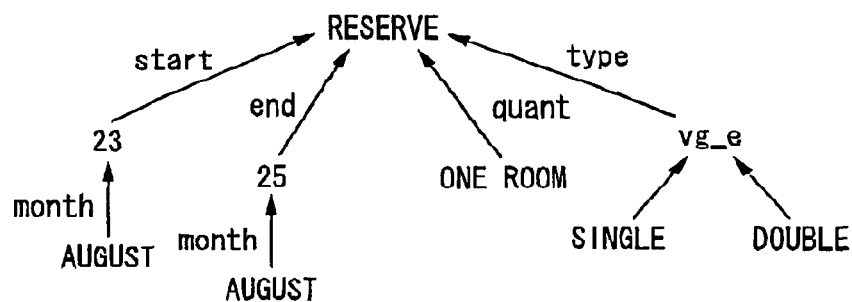
FIG. 14 is a diagram showing the slot allocation table after the language understanding apparatus according to the embodiment has solved slot collision and intrasentential omission.
FIG. 15 is a diagram showing an example of a semantic tree generated from the slot allocation table by the language understanding apparatus according to the embodiment.

FIG. 14 shows the slot allocation table shown in FIG. 13 after the slot collision solution in step S335 and the intrasentential omission solution in step S336 are carried out.

Meanwhile, for example, when detecting the concept representation "June" which has the same concept as the concept representation "August" and appears before the concept representation "August", and detecting that "from" stored beforehand in the storage section 6 as a marker indicating the origin directly accompanies the concept representation "June", the intrasentential omission solving section 35 determines that the concept representations "August" and "June" are in parallel. Although the slot "year" of the concept representation "August" is unbidden, the intrasentential omission solving section 35 detects that the same slot "year" as that of the concept representation "June" is bidden for the concept representation "last". Accordingly, the intrasentential omission solving section 35 bids the slot "year" of the concept representation "August" for "last" as done for the concept representation "June".

[5.3.5 Scoring]

In step S337 in FIG. 9, the scoring section 36 of the frame interpreter 30 scores each frame combination according to how slots are filled in the slot allocation table generated by the intrasentential omission solving section 35 or the slot allocation table to which frame interpretation has been terminated and the degree of matching between contexts. Scores are given according to the following rules.

(1) With regard to slots, (a) if there is any slot in slots filled with values which has a corresponding marker in the frame definition data, stored in the storage section 6, and accompanying a bidden target concept, one point is added for each such slot, and (b) −2n points are added where n is the number of slots not filled with values.

(2) With regard to the degree of matching between contexts, (a) if there is the same frame as the one included in an immediately previous utterance, one point is added for each such frame.

The scoring section 36 stores the frame combination, the generated slot allocation table and score data in the storage section 6 in association with one another. Then, the scoring section 36 determines if the processes of steps S333 to S337 have been executed for every frame combination (step S338), and, if there is any unexecuted frame combination, selects an unexecuted frame combination, and executes the sequence of processes starting from step S333 again for the selected frame combination. If the processes of steps S333 to S337 have been finished for every frame combination, the scoring section 36 outputs slot allocation table data of the best score to the semantic tree generator 40.

[5.4 Semantic Tree Generation]

Subsequently, the semantic tree generator 40 generates a semantic tree from the result of the frame interpretation result in step S340. Specifically, the processes of the following steps S341 to S343 are carried out in the semantic tree generating process.

[5.4.1 Slot Grouping]

In step S341 in FIG. 9, the slot value grouping section 41 of the semantic tree generator 40 groups and separates repetitive patterns each provided with a plurality of slot values into groups.

Let us consider the Example 1. The five concept representations "tomorrow". "Tokyo". "day after tomorrow", "Osaka" and "Kyoto" all represent slot values of the frame of the concept "weather" represented by the concept representation represented by the concept representation "weather". Of the five concept representations, "tomorrow" is relevant only to "Tokyo", and likewise "day after tomorrow" is relevant only to "Osaka" and "Kyoto".

This representation does not demand an answer on the "Osaka" weather "tomorrow". Simply considering that the slot "date" of the frame of the concept "weather" takes two values, "tomorrow" and "day after tomorrow", a semantic representation disregarding the relationship with the value of another slot "place" is given, the aforementioned error may occur. Accordingly, repetitive patterns each provided with a plurality of slots are detected and are grouped.

Specifically, for each frame, the slot value grouping section 41 has bidden the same slot in the frame for a plurality of target concepts from the slot allocation table, and detects whether there is a patter of appearance of that slot. When such a pattern is detected, the slot value grouping section 41 groups target concepts for each repetitive appearance pattern.

[5.4.2 Conversion]

In step S342 in FIG. 9, the converter 42 of the semantic tree generator 40 performs a conversion process of converting the slot allocation table into a semantic tree. Basically, the converter 42 creates a single content node for each concept representation/pronoun representation, but creates and groups content nodes by the number of groups into a group node for a concept representation whose slot allocation is separated into a plurality of slot value groups. FIG. 15 shows a semantic tree for the Example 2 at this stage. Note that the semantic tree of the Example 1 shown in FIG. 6 is also on this stage.

Specifically, the converter 42 refers to the slot allocation table shown in FIG. 14 to make the concept representation "reserve" which appears at the rearmost position as the root of the semantic tree. Then, the converter 42 creates nodes corresponding to the slots "start", "end", "type" and "quant" of the frame (reserveF1) of the concept representation "reserve" under the root. When one concept representation corresponds to one slot, however, the converter 42 creates a content node indicating the concept representation. When there are a plurality of concept representations for one slot, the converter 42 creates an enumeration type group node "vg_e", and creates content nodes indicating concept representations enumerated in subordination thereof. Therefore, the concept representations "23", "25" and "one each" are described as content nodes in correspondence to the slots "start" and "quant" respectively under "reserve". Because the concept representations "single" and "double" correspond to the slot "type", the group node "vg_e" is described to which the content nodes of the concept representations "single" and "double" are described in subordination.

Further, if a slot is bidden for the concept representation described as a content node, the converter 42 creates nodes in subordination thereto the concept representation. Because the slot "month" is bidden for the concept representation "August" for the concept representations "23" and "25" in FIG. 14, the concept representation "August" of the slot "month" is described as a subordinate content node to each of the concept representations "23" and "25".

[5.4.3 Factorization]

In stop S343 in FIG. 9, the factorization section 43 of the semantic tree generator 40 performs a factorization process of creating a semantic tree of the form which makes a concretization function available from the semantic tree created by the converter 42.

A concretization function generally does not take parameters in consideration of a parallel structure. Therefore, it is necessary to convert the generated semantic tree into a semantic tree in such a way at only parameters corresponding to concept representations which are in parallel to one another are changed, and the other parameters become common. That is, because a content node cannot be associated with a concretization function until the content node has a group node as a child as shown in FIG. 15, factorization is executed to expand a content node having a group node as a child node to ensure mapping into a concretization function. The factorized semantic tree has a single group node on the root with the other nodes all being content nodes.

Figure 16:
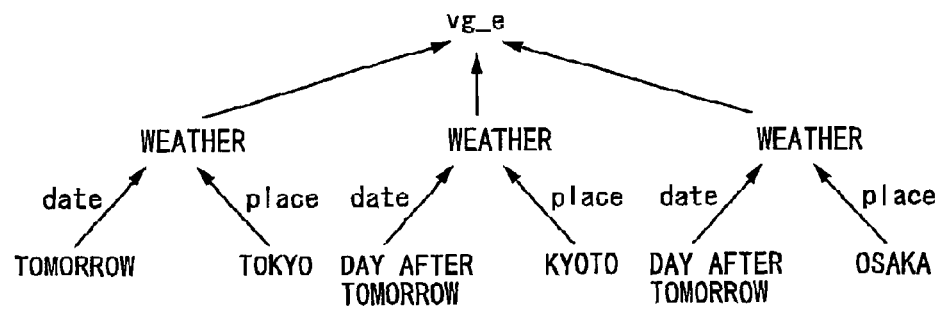
FIG. 16 is a diagram showing an example of a semantic tree factorized by the language understanding apparatus according to the embodiment.
Figure 17:
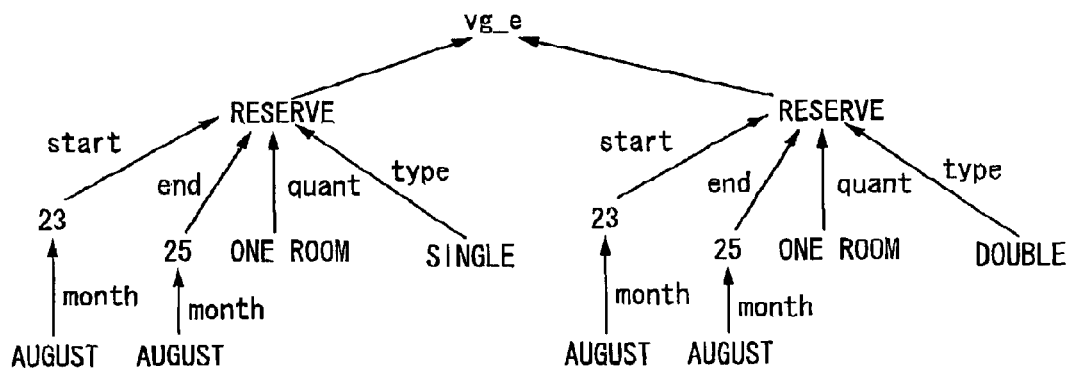
FIG. 17 is a diagram showing another example of a semantic tree factorized by the language understanding apparatus according to the embodiment.

Unless otherwise designated, slot values are all multiplied to be combined. For example, an expression "weather in Tokyo and Osaka tomorrow and day after tomorrow" is factorized to a semantic tree corresponding to four representations "weather in Tokyo tomorrow", "weather in Osaka tomorrow", "weather in Tokyo day after tomorrow" and "weather in Osaka day after tomorrow". FIG. 16 shows a semantic tree resulting from the factorization of the semantic tree in FIG. 6, and FIG. 17 shows a semantic tree resulting from the factorization of the semantic tree in FIG. 15.

For example, the factorization section 43 operates as follows. The factorization section 43 detects one group node from the current semantic tree. Then, for each of content nodes subordinate to the detected group node, the factorization section 43 replaces the group node into the content node and a tree structure subordinate thereto, creates a semantic tree leaving the other nodes unchanged, and arranges an enumeration of the generated semantic tees at a subordinate node having the topmost node as a group node. Then, the factorization section 43 repeats such a process until no other group nodes are left in the semantic trees.

Multiplication of slot values should not necessarily be adequate to provide combinations. In case where one says "place right hand and left hand on right knee and left knee", for example, it is appropriate to interpret the expression as "place right hand on right knee and place left hand on left knee" in a distributive fashion, and exclude "place right hand on left knee" and "place left had on right knee". Because in which case the distributive interpretation is more appropriate than the combination interpretation is not known beforehand, such is designated as a domain knowledge and held in the storage sections.

By way of contrast, "weather in Tokyo tomorrow and in Osaka day after tomorrow" is separated into "weather in Tokyo tomorrow" and "weather in Osaka day after tomorrow" by slot value grouping in step S341, not factorization.

[5.4 Task Representation Generation]

In step S400 in FIG. 9, the task representation generator 5 generates a task representation from the semantic tree output from the factorization section 43 of the semantic tree generator 40 using a concretization function. If there is an empty slot value corresponding to an essential argument (parameter) for the concretization function at this time, a clarification demand representation of the slot is read from the storage section 6, and the read clarification demand representation is output to a user to allow the user to input a concept representation for the empty slot. This process may take place before the semantic tree is output in stop S400. Alternatively, a default value prestored in the storage section 6 may be read and used.

When the language understanding apparatus 1 is used as a hotel reservation dialogue system, a generated task representation is given to a hotel reservation task processing module. As the task is executed, a reservation process is executed to, for example, perform data processing on hotel reservation, output the processing result and then output an inquiry to acquire information to be gathered from the user.

When the language understanding apparatus 1 is used for robot action control, a task representation is given to a task processing module which instructs a character (animation robot) in three-dimensional virtual space to take a physical action. This can permit an instruction for movement of an object or the like to be given to the robot by voice.

[6. Dialogue Experiment]

The following are the results of an experiment-conducted for evaluation of a dialogue system for hotel reservation constructed using the above-described language understanding apparatus 1.

[6.1 Dialogue System]

The language understanding apparatus 1 has a domain-independent dialogue managing modulo capable of handing a slot-filling based task. The amount of description of a downs dependent knowledge of the constructed hotel reservation dialogue system is merely a 95-line XML file defining the ontology, and a 150-line program described in the Java (registered trademark) language as a concretization function and a task-dependent dialogue process (confirmation of money or the like). The language understanding apparatus 1 uses the concept structure data shown in FIG. 3. With the use of the language understanding frame work that is realized by the language understanding apparatus 1 of the embodiment, can construct a system for performing advanced language understanding can be constructed with such a smaller amount of description and more quickly than the conventional template-based dialogue system.

Because an instance having a proper name does not exist in the hotel reservation dialogue system set for the experiment, a pronoun representation is not defined. On the premise that an anaphora representation does not occur in the experiment domain, an anaphora solution is not handled.

Although the details of the dialogue managing module are omitted, dialogue understanding based on unification on the semantic tree level is carried out. The clarification demand given to the user by the hotel reservation dialogue system is a representation described in the slot definition, and no particular measures are taken to change the representation according to the dialogue state.

Although the system demands one slot to be clarified at a time, the user can provided more slot values than demanded before the system, shown in FIG. 18. It is possible to designate slot values of frames represented by different content nodes by referring to partial information, as shown in FIG. 19. It takes considerable time to construct a system which understands dialogues in the examples with the ordinary parsing system. First of all, it is difficult to provide a semantic representation of a unagi sentence, like "single smoking". In addition, the system construction requires a work of constructing a semantic representation generator capable of generating a semantic representation. Those representation processes are likely to be treated exceptionally, thus making the design and maintenance of the program troublesome.

In understanding an utterance like U3 in FIGS. 18 and 19, the implemented dialogue managing module understands the utterance by simply adding a language representation of the current frame of interest to the input utterance.

In the case of FIG. 19, a representation "reserve single smoking and double non-smoking" is combined, and the semantic representation generating process shown in step S300 is executed for the representation. Although the representation "reserve single smoking and double non-smoking" is non-grammatical, the representation can be interpreted without problems due to the template-based approach of the language understanding apparatus of the embodiment. Adequate understanding is obtained by unifying the generated semantic tree and a semantic tree holding previous utterance contents.

[6.2 Dialogue Experimental Assignments]

Five assignments for reserving hotel rooms were created and were handled by nine subjects. The subjects were instructed to designate conditions, such as a stay-night period, and reserve for a room which meets the conditions. The five assignments are shown in FIG. 20. The interaction is a keyboard interaction via a Web browser.

Nearly common assignment instructions were given to all the assignments shown in FIG. 20, and conditions were designated for the individual assignments. The following are the common assignment instructions.

"You will reserve the Honda International Hotel for OOO. Interacting with an automatic reservation system, reserve a room which meets the following conditions. There is no time limit. You may organize the reservation contents with paper and a pen before starting interaction."

The part "OOO" was adequately changed assignment by assignment. It was changed to "private trip" in assignment 1, "trip with friends" in assignment 2, "family trip" in assignment 3, and "business trip" in assignments 4 and 5. The details of the designated conditions for the individual assignments are show in FIG. 20. The subjects are at liberty to do except for the designated conditions. Examples of the dialogues obtained in the experiment are shown in FIGS. 21 and 22.

[6.3 Dialogue Experimental Results]

FIG. 23 shows the numbers of successes for each assignment and the total numbers of successes, and the rate of successes. The total number of dialogues collected are 45 dialogues excluding five dialogues (one in assignment 2, one in assignment 4 and three in assignment 5) which were forcibly disconnected due to the implementation problem of the system. As shown in FIG. 23, there were 24 successful dialogues with a success rate of 63.4%. The success rate with failure originating from the implementation problem was 57.7%.

Removing utterances of a single clause, such as "yes", "no", "one night" or "single", from the total utterances (372 utterances) collected in the experiment leaves 216 utterances. Further removing utterances making inquiries and demands other than domain targets ("Which room is the cheapest?", "Expensive! Make it cheaper!", etc.) and utterances containing a single concept representation which was not a single clause from the 216 utterances yielded 151 utterances for which the performance of the semantic representation generating process was checked.

First, the individual concept representations in the input utterances were associated with a dependency structure and classified along two axes. Specifically, (1) whether the dependency destination is linguistically adequate when each concept representation is associated with the dependency tree structure, and (2) whether the dependency destination and its source have a relationship between a semantic frame and a slot value. In the case of the Example 2, for example, "25", "double" and "one each" have adequate dependency destinations and each dependency destination ("reserve") and its source have a relationship between a semantic frame ad a slot value.

While "23" and "single" have adequate dependency destinations, however, each dependency destination and its source do not have a relationship between a semantic frame and a slot value. The classification results are shown in FIG. 24. OK and NG represent whether the dependency destination is adequate or not and YES and NO represent whether the dependency destination mud the source are in a frame-slot relation. It is understood from the diagram that there are many events with adequate dependency relationships but failing to have a direct relationship between a semantic frame and a slot value.

Next, whether each concept representation was adequately interpreted as the value of a frame was checked.

The appropriateness at the stage of generating a concept representation as a semantic tree was evaluated, with no consideration taken on the subsequent unification-based dialogue understanding. The results are shown in FIG. 25. The column of OK shows the number of concept representations which took correct frame values, and the column of NG shows the number of concept representations which did not take correct frame values. It was confirmed that even with parsing not matching with a semantic step, semantic interpretation could be carried out adequately.

With a parallel structure and intrasentential omission finally checked, there are a total of 77 parallel structures, 56 parallel structures equivalent to having the same slot value of the frame of one concept representation (case (1) in the description of step S336) and 21 parallel structures equivalent to having slot values in the "start-end" relationship of the frame of one concept representation (case (2) in the description of step S336). 88.3% of the parallel structures could be processed properly. There were 15 intrasentential omissions two of which failed.

[7. Advantages]

The language understanding apparatus according to the embodiment have the following advantages (1) to (6).

(1) An Existing Parser can be Used without Adjustment.

Because an existing parser is used without grammatical replacement or adjustment, it is easy to replace the parser and it is possible to introduce a latest parser quickly. It is possible to reduce locations in the system that need to be changed at the time of adapting to new words or expressions, thus making the development and maintenance easier. If it is necessary to rewrite a plurality of locations to make one change, the efficiency drops by more than the added amount of simple works, increasing bugs. According to the embodiment, however, the use of an existing parser with an extensive grammar can allow the parser to handle a domain-independent side of a language, making the development efficiency significantly better than the case where a system developer prepares the grammar himself or herself.

(2) A Semantic Representation Generating Mechanism can be Realized Merely by Describing a Domain Knowledge.

Because an exist parser is used and a semantic representation generator need not be constructed the development of the language understanding apparatus becomes easier. Most of the part relating to language processing can be made into a black box, so that a developer without the knowledge of language processing can easily develop a parsing-based language understanding apparatus. It is also possible to provide an IDE (Integrated Development Environment) for development of language understanding applications.

(3) Automatic Process of a Parallel Structure and Intrasentential Omission is Possible.

The language understanding apparatus according to the embodiment facilitates the processing of a parallel structure. For a final semantic representation output, an application developer need not be aware of a parallel structure and an accompanying intrasentential omission in describing the process of converting the semantic representation to a task representation.

(4) Advantages of Template System.

The language understanding apparatus according to the embodiment can ensure template-based understanding while using parsing. A process to be executed for each row in the slot allocation table is no different from a pattern matching process using each semantic frame as a template, except that syntax-structure oriented constrains are involved moderately. Because templates are semantic templates, not templates for surface representations, it is unnecessary to prepare a lot of patterns to cover surface variations. The language understanding apparatus according to the embodiment can accurately understand even an enumeration of keywords, such as "tomorrow single three rooms double two rooms non-smoking three nights".

(5) Non-combined Expressions can be Understood.

Suppose that when a user expresses reservation for a single room and a double room from a certain date while making a hotel reservation, the user is asked for a check-out date. In such a case, we can make such a reply as "single is on 25 and double is on 26", which is so-called "unagi sentence". The presence of a single room is not equivalent to a date of "25", and a single room does not have au attribute which takes a value of "25". "25" is just an attribute value of one instance of a concept "reserve" which is indirectly referred to by the word "single". Seriously handing such an expression with a parsing system is generally very troublesome, but can be easily done by the proposed approach of the present invention. While a system using surface patterns may relatively easily describe a process itself corresponding to each pattern, it is necessary to prepare a vast amount of variations of patterns.

(6) Users can Get Benefits of Clarification of the Domain Concept Structure.

Systematization of domain-defining concepts or clarification of the ontology can improve the development efficiency on other portions of the language understanding apparatus than the language processing portion. Language processing is just a human interface of an application system, and the task processed module is the core of the system. The task processing module needs to exchange information with not only the language processing module to generate a task representation from an input natural language representation, but also multifarious modules. In a system of executing a robot control task, for example, the hotel reservation task processing module needs to exchange information using various modules to manage the colors, shapes and types of objects identified by a robot, states including the current position of the robot, and so forth, and symbols. Organizing the ontology can ensure prospective developments on the interfaces to connect the modules, and the modules themselves. Unless the ontology is not organized clearly, those pieces of information are present in the system dispersively (further implicitly), thus lowering the development efficiency and maintenanceability.

Because of the use of parsing, the language understanding apparatus according to the embodiment can understand more complex expressions than the scheme of using keyword matching or surface patterns. Even with the use of an existing general-purpose parser in syntax analysis it is unnecessary to adjust the parser according to a domain.

The language understanding apparatus according to the embodiment can achieve parsing to adequate process a parallel structure and intrasentential omission merely with a domain knowledge provided, and without creating a semantic representation generator, so that a dialogue system can be constructed quickly.

[8. Others]

The language understanding apparatus 1 has a computer system inside. The processes of the operations of the text conversion section 3, the semantic representation generator 4 and the task representation generator 5 of the language understanding apparatus 1 are stored in a computer readable recording medium in the form of a program, and the above-described processes are carried out as the computer system reads and executes the program. The "computer system" mentioned herein includes hardware, such as a CPU, various memories, an OS (Operating System), and peripheral devices.

The "computer system" includes a homepage providing environment (or display environment) when a WWW system is used.

The "computer readable recording medium" is a portable medium, such as a flexible disk, magneto-optical disk, ROM or CD-ROM, or a memory device, such as a hard disk, installed in the computer system. Further, the "computer readable recording medium" includes a type which operationally holds a program for a short period of time, such as a communication line in a case of transmitting a program over a network like the Internet or a communication circuit like a telephone line, or a type which holds a program for a given time, such as a volatile memory inside a computer system to be a server or a client in such a case. The program may achieve some of the above-described functions, or may realize the above-described functions in combination with a program already recorded on the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A language understanding apparatus comprising:
a storage section that stores:
concept structure data indicating a correlation between a tree structure of a concept to be used in a domain and a concept representation specifying the concept to be used in the domain,
frame definition data corresponding to the concept to be used in the domain and indicating a correlation between one or more semantic frames for representing the concept to be used in the domain by another concept,
one or more variables to be used in the one or more semantic frames, and
variable definition data indicating a concept to be used as a variable;
a phrase interpreter that receives input utterance data detects a concept representation included in an utterance content indicated by the input utterance data by referring to the storage section, and reads information of a concept corresponding to the detected concept representation from the storage section; and
a bidding section that;
reads information on a variable of a semantic frame corresponding to the concept indicated by the information read by the phrase interpreter and information on a concept corresponding to the variable by referring to the storage section, and
allocates by writing to a variable allocation table from the concept representation detected by the phrase interpreter, for each semantic frame read:
a concept representation associated with a concept corresponding to each variable of the semantic frame or a subordinate concept of that concept, and
a concept representation whose variable of another semantic frame is not written, and
generates variable allocation table data indicating a bidding result.

2. The language understanding apparatus according to claim 1, further comprising
an access table generator that receives the input utterance data, performs parsing of the utterance content indicated by the received input utterance data to acquire a dependency relationship among morpheme sequences constituting the utterance content, and generates access table data indicating an accessibility among the morpheme sequences based on the acquired dependency relationship, wherein
when making a bid for each semantic frame, the bidding section specifies, from the concept representation detected by the phrase interpreter, a concept representation corresponding to a concept corresponding to each variable of the semantic frame or a subordinate concept of that concept, and a concept representation whose variable of another semantic frame is not bidden, and bids the variable for the specified concept representation when the access table data generated by the access table generator indicates that the concept representation corresponding to the semantic frame is accessible to the specified concept representation.

3. The language understanding apparatus according to claim 2, wherein
the access table generator separates or combines the morpheme sequences in such a way that one of the morpheme sequences undergone the parsing includes one parsed concept representation detected by the phrase interpreter, and generates the access table data using a resultant morpheme sequence.

4. The language understanding apparatus according to claim 1, further comprising:
a frame combination generator that, by referred to the storage section, specifies a semantic frame corresponding to the concept read by the phrase interpreter, and, when there are a plurality of semantic frames specified in correspondence to one concept, generates available semantic frame combinations, wherein the bidding section generates the variable allocation table data for each of the semantic frame combinations generated by the frame combination generator; and
a scoring section that gives a score based on a state of bidding a variable for a concept representation by referring to the variable allocation table data corresponding to each of the semantic frame combinations generated by the frame combination generator, and selects a semantic frame combination used in an utterance content based on the given score.

5. The language understanding apparatus according to claim 1, wherein:
the variable definition data further includes information on a concept representation specifying a variable;
referring to the storage section, the phrase interpreter detects a concept representation included in the utterance content indicated by the received input utterance data and reads a concept or a variable corresponding to the detected concept representation; and
the language understanding apparatus further comprises a variable collision solving section that, when a plurality of variable of a same semantic frame are bidden for one concept representation by the bidding section, detects if another concept representation specifying a variable accompanies the concept representation in the utterance content, and, upon detecting the accompanying another concept representation, selects a variable specified by the accompanying another concept representation as a variable to be bidden for the concept representation and rewrites the variable allocation table data based on a selection result.

6. The language understanding apparatus according to claim 1, wherein:
the variable definition data further includes information on a marker specifying a variable; and
the language understanding apparatus fiber comprises a variable collision solving section that, when a plurality of variable of a same semantic frame are bidden for one concept representation by the bidding section, detects if a marker accompanies the concept representation in the utterance content by referring to the storage section, and, upon detecting the accompanying marker, selects a variable specified by the marker as a variable to be bidden for the concept representation and rewrites the variable allocation table data based on a selection result.

7. The language understanding apparatus according to claim 1, further comprising
a variable collision solving section that, when a plurality of variables of a same semantic frame are bidden for each of a plurality of concept representations corresponding to a same concept by the bidding section, selects a variable to be bidden for each of the plurality of concept representations in such a way that an order of appearance of the plurality of concept representations in the utterance content corresponds to an order of variables indicated by information on a variable appearance order stored in the storage section, and rewrites the variable allocation table data based on a selection result.

8. The language understanding apparatus according to claim 1, further comprising
a syntax error parser that, when there is a blank variable which has not been bidden for any concept representation by the bidding section, bids the blank variable for a concept representation which matches with a concept corresponding to the blank variable and for which another variable is not bidden, and rewrites the variable allocation table data based on a bidding result.

9. The language understanding apparatus according to claim 1, further comprising
an intrasentential omission solving section that, for a concept representation which corresponds to a semantic frame and for which a variable of the semantic frame is not bidden by the bidding section, specifies another concept representation appearing before the concept representation in the utterance content and corresponding to a same concept as the concept representation, detects that the specified another concept representation and the concept representation form a parallel structure, detects that a semantic frame corresponding to the specified another concept representation has a same variable as the unbidden variable of the semantic frame corresponding to the concept representation, and, when detecting that the detected variable of the semantic frame corresponding to the specified another concept representation is bidden for a further concept representation by the bidding section, bids the unbidden variable of the semantic frame corresponding to the concept representation for the detected further concept representation and rewrites the variable allocation table data based on a bidding result.

10. The language understanding apparatus according to claim 1, further comprising
a semantic tree generator that, referring to the variable allocation table data, generates a semantic tree from a concept representation having a semantic frame and a concept representation for which a variable of the semantic frame is bidden.

11. The language understanding apparatus according to claim 10, wherein
the semantic tree generator generates a semantic tree by arranging an enumeration of concept representations for which individual variables of a semantic frame is to be bidden at a lower node of a concept representation corresponding to the semantic frame, and, when the semantic frame corresponds to an arranged concept representation, repeating arranging the concept representations for which individual variables of the semantic frame of the arranged concept representation is to be bidden at a lower node of the arranged concept representation.

12. The language understanding apparatus according to claim 11, wherein
the semantic tree generator arranges a single concept representation for a bidding destination when there is the single concept representation for the bidding destination or an enumeration of group nodes indicating an enumeration when there are a plurality of variables to be bidden, at a lower node of a concept representation corresponding to a semantic frame, arranges an enumeration of a plurality of concept representations for which variables corresponding to the group nodes are to be bidden, under command of the group nodes indicating the enumeration, and, when the semantic frame corresponds to an arranged concept representation, repeats a similar process for the semantic frame of the arranged concept representation to generate a semantic tree, and converts the generated semantic tree to a semantic tree having only top nodes as group nodes when there is a group node in the generated semantic tree.

13. The language understanding apparatus according to claim 11, wherein
when detecting a repetitive pattern comprised of a plurality of variables in a same semantic frame, the semantic tree generator groups the repetitive patter and generates the semantic tree for each group.

14. The language understanding apparatus according to claim 11, further comprising
a task representation generator that generates a task execution instruction from the semantic tree generated by the semantic tree generator.

15. A language understanding method for use in a language understanding apparatus which converts an utterance content of a natural language into a semantic representation to be used in computer processing and has a storage section that stores concept structure data indicating a correlation between a tree stricture of a concept to be used in a domain and a concept representation specifying the concept to be used in the domain, frame definition data corresponding to the concept to be used in the domain and indicating a correlation between one or more semantic frames for representing the concept to be used in the domain by another concept, and one or more variables to be used in the one or more semantic frames, and variable definition data indicating a concept to be used as a variable, the method comprising:
a phrase interpreting step of receiving input utterance data, detecting a concept representation included in an utterance content indicated by the input utterance data by referring to the storage section, and red information of a concept corresponding to the detected concept representation from the storage section; and
a bidding step of:
reading information on a variable of a semantic frame corresponding to the concept indicated by the information read at the phrase interpreting step and information on a concept corresponding to the variable by referring to the storage section,
allocating by writing to a variable allocation table from the concept representation detected at the phrase interpreting step, for each semantic frame read:
a concept representation associated with a concept corresponding to each variable of the semantic frame or a subordinate concept of that concept, and
a concept representation whose variable of another semantic frame is not written, and generating variable allocation table data indicating a bidding result.

16. A non-transitory medium holding computer-executable instructions that when executed cause at least one computing device to:
store in a storage section;
concept structure data indicating a correlation between a tree structure of a concept to be used in a domain and a concept representation specifying the concept to be used in the domain,
frame definition data corresponding to the concept to be used in the domain and indicating a correlation between one or more semantic frames for representing the concept to be used in the domain by another concept, and one or more variables to be used in the one or more semantic frames, and variable definition data indicating a concept to be used as a variable;

receive with a phrase interpreter input utterance data, detects a concept representation included in an utterance content indicated by the input utterance data by referring to the storage section, and reads information of a concept corresponding to the detected concept representation from the storage section; and with a bidding section:

read information on a variable of a semantic frame corresponding to the concept indicated by the information read by the phrase interpreter and information on a concept corresponding to the variable by referring to the storage section, allocate by writing to a variable allocation table from the concept representation detected by the phrase interpreter for each semantic frame read:

a concept representation associated with a concept corresponding to each variable of the semantic frame or a subordinate concept of that concept, and a concept representation whose variable of another semantic frame is not written, and generate variable allocation table data indicating a bidding result.

* * * * *